United States Patent [19]

Hettinger

[11] Patent Number: 4,869,879

[45] Date of Patent: Sep. 26, 1989

[54] VENTED RISER FOR STRIPPING SPENT CATALYST

[75] Inventor: William P. Hettinger, Russell, Ky.

[73] Assignee: Ashland Oil, Inc., Ashland, Ky.

[21] Appl. No.: 533,371

[22] Filed: Sep. 16, 1983

Related U.S. Application Data

[62] Division of Ser. No. 361,661, Mar. 25, 1982, Pat. No. 4,424,116.

[51] Int. Cl.⁴ ............................. B01J 8/18; B01J 8/26
[52] U.S. Cl. .................................. 422/144; 422/142; 422/145
[58] Field of Search ............... 422/140, 142, 144, 145; 208/72, 74, 75, 78, 80, 113, 120, 164, 151, 154, 155; 502/43

[56] References Cited

U.S. PATENT DOCUMENTS

| | | | |
|---|---|---|---|
| 2,325,136 | 7/1943 | Kassel | 422/144 X |
| 2,416,730 | 3/1947 | Arveson | 422/144 X |
| 2,461,958 | 2/1949 | Bonnell | 422/144 X |
| 2,509,745 | 5/1950 | Riggs | 422/144 X |
| 2,595,909 | 5/1952 | Trainer et al. | 422/144 |
| 2,871,174 | 1/1959 | Kunreuther | 422/144 X |
| 3,888,762 | 6/1975 | Gerhold | 422/144 X |
| 4,036,779 | 7/1977 | Schatz et al. | 208/164 X |
| 4,310,489 | 1/1982 | Fahrig et al. | 422/144 X |
| 4,390,503 | 6/1983 | Walters et al. | 422/142 X |
| 4,422,925 | 12/1983 | Williams et al. | 208/75 |
| 4,448,674 | 5/1984 | Bartholic | 208/164 X |

*Primary Examiner*—Michael S. Marcus
*Attorney, Agent, or Firm*—Richard C. Willson, Jr.; Stanley M. Welsh

[57] ABSTRACT

A process for economically converting carbo-metallic oils to lighter products. The carbo-metallic oils contain 650° F.+ material which is characterized by a carbon residue on pyrolysis of at least about 1 and a Nickel Equivalents of heavy metals content of at least about 4 parts per million. This process comprises flowing the carbo-metallic oil together with particulate cracking catalyst through a progressive flow type reactor having an elongated reaction chamber, which is at least in part vertical or inclined, for a predetermined vapor riser residence time in the range of about 0.5 to about 10 seconds, at a temperature of about 900° to about 1400° F., and under a pressure of about 10 to about 50 pounds per square inch absolute sufficient for causing a conversion per pass in the range of about 40% to 90% while producing coke in amounts in the range of about 6 to about 14% by weight based on fresh feed, and laying down coke on the catalyst in amounts in the range of about 0.3 to about 3% by weight. The spent, coke-laden catalyst from the stream of hydrocarbons formed by vaporized feed and resultant cracking products is separated, the sorbed hydrocarbons are stripped from the spent catalyst particles by mixing them with hot regenerated catalyst particles and passing the mixture through an elongated stripping chamber where desorbed hydrocarbons are cracked by regenerated catalyst particles which are present. The stripped catalyst is regenerated in one or more regeneration beds in one or more regeneration zones by burning the coke on the spent catalyst with oxygen. The catalyst particles are retained in the regeneration zone or zones in contact with the combustion-supporting gas for an average total residence time in said zone or zones of about 5 to about 30 minutes to reduce the level of carbon on the catalyst to about 0.25% by weight or less. The regenerated catalyst is recycled to the reactor and contacted with fresh carbo-metallic oil.

3 Claims, 2 Drawing Sheets

VENTED RISER FOR STRIPPING SPENT CATALYST

This application is a division of application Ser. No. 06/361,661, filed 3/25/82, now U.S. Pat. No. 4,424,116.

CROSS-REFERENCES TO RELATED APPLICATIONS

The following patents and patent applications relate to the same general field as that of the present invention, and these patents and patent applications are each hereby incorporated by reference.

U.S. patent application Ser. No. 254,367, filed Apr. 15, 1981 (now abandoned) which is a continuing application of Ser. No. 99,050, filed Nov. 30, 1979 (now abandoned), which in turn, is a continuing application of Ser. No. 069,601, filed Dec. 14, 1978 (now abandoned) in the names of George D. Myers and Lloyd E. Busch for "Method for Cracking Residual Oils".

U.S. patent application Ser. No. 228,393 (now abandoned), filed Jan. 26, 1981, a continuing application of Ser. No. 63,497, filed Aug. 3, 1979, which is a continuing application of Ser. No. 969,602, filed Dec. 12, 1978 in the names of George D. Myers and Lloyd E. Busch for "Multi-Stage Regeneration on Spent Catalyst".

U.S. patent application Ser. No. 94,091, filed Nov. 14, 1979 (now U.S. Pat. No. 4,299,687), in the names of George D. Myers and Lloyd E. Busch for "Carbo-Metallic Oil Conversion with Controlled $CO/CO_2$ Ratio in Regeneration".

U.S. patent application Ser. No. 94,092, filed Nov. 14, 1979 (now U.S. Pat. No. 4,332,673) in the name of George D. Myers for "High Metal Carbo-Metallic Oil Conversion".

U.S. patent application Ser. No. 94,216 (now U.S. Pat. No. 4,341,624) filed Nov. 14, 1979, in the name of George D. Myers for "Carbo-Metallic Oil Conversion".

U.S. patent application Ser. No. 94,217 (now U.S. Pat. No. 4,347,122), filed Nov. 14, 1979 in the names of George D. Myers and Lloyd E. Busch for "Carbo-Metallic Oil Conversion".

U.S. patent application Ser. No 94,227 (now U.S. Pat. No. 4,354,923), filed Nov. 14, 1979 in the names of George D. Myers and Lloyd E. Busch for "Carbo-Metallic Oil Conversion With Liquid Water in Vented Riser With Controlled $CO/CO_2$ Ratio During Catalyst Conversion".

U.S. patent application Ser. No. 246,751 (now U.S. Pat. No. 4,376,696), filed Mar. 23, 1981 in the name of George D. Myers for "Addition of $MgCl_2$ to Catalyst".

U.S. patent application Ser. No. 246,782 (now U.S. Pat. No. 4,375,404), filed Mar. 23, 1981 in the name of George D. Myers for "Addition of Chlorine to Regenerator".

U.S. patent application Ser. No. 246,791 (now U.S. Pat. No. 4,376,038), filed Mar. 23, 1981 in the name of George D. Myers for "Use of Naphtha in Carbo-Metallic Oil Conversion".

U.S. patent application Ser. No. 251,032 (now U.S. Pat. No. 4,417,975), filed Apr. 3, 1981 in the names of George D. Myers and Lloyd E. Busch for "Addition of Water to Regeneration Air".

U.S. patent application Ser. No 252,967 (now abandoned), filed Apr. 10, 1981 in the names of Hettinger et al for "Trapping of Metals Deposited on Catalytic Materials During Carbo-Metallic Oil Conversion".

U.S. patent application Ser. No. 258,265 (now U.S. Pat. No. 4,377,470) which is a continuing application of Ser. No. 255,398, filed Apr. 20, 1981 (now abandoned) in the names of Hettinger, et al for "Immobilization of Vanadia Deposited on Catalytic Materials During Carbo-Metallic Oil Conversion".

U.S. patent application Ser. No. 255,931 (now abandoned) filed Apr. 20, 1981 in the names of Hettinger et al for "Immobilization of Vanadia Deposited on Sorbent Materials During Treatment of Carbo-Metallic Oils".

U.S. patent application Ser. No. 255,965, filed Apr. 20, 1981 (now abandoned) in the name of Stephen M. Kovach for "A Method for the Disposal of Sulfur Oxides from a Catalytic Cracking Operation".

U.S. patent application Ser. No. 263,391 (now U.S. Pat. No. 4,407,714), filed May 13, 1981 in the names of Hettinger et al for "Process for Cracking High-Boiling Hydrocarbons Using High Pore Volume, Low Density Catalyst".

U.S. patent application Ser. No. 263,394 (now U.S. Pat. No. 4,390,503), filed May 13, 1981 in the names of Walters et al for "Carbo-Metallic Oil Conversion with Ballistic Separation".

U.S. patent application Ser. No. 263,395 (now U.S. Pat. No. 4,454,025), filed May 13, 1981 in the name of William P. Hettinger for "Passivating Heavy Metals in Carbo-Metallic Oil Conversion".

U.S. patent application Ser. No. 263,396 (now U.S. Pat. No. 4,406,773), filed May 13, 1981 in the names of Hettinger et al for "Magnetic Separation of High Activity Catalyst from Low Activity Catalyst".

U.S. patent application Ser. No. 263,397 (now U.S. Pat. No. 4,384,948), filed May 13, 1981 in the name of Dwight F. Barger for "Single Unit RCC".

U.S. patent application Ser. No. 263,398 (now U.S. Pat. No. 4,374,019), filed May 13, 1981 in the names of Hettinger et al for "Process for Cracking High boiling Hydrocarbons Using High Ratio of Catalyst Residence Time to Vapor Residence Time".

International Application Ser. No. PCT/US81/00356, filed Mar. 19, 1981 in the names of Beck et al for "Immobilization of Vanadia Deposited on Catalytic Materials During Carbo-Metallic Oil Conversion".

International Application Ser. No. PCT/US81/00357, filed Mar. 10, 1981 in the names of Beck et al for "Immobilization of Vanadia Deposited on Sorbent Materials During Treatment of Carbo-Metallic Oils".

International Application Ser. No. PCT/US81/00492, filed Apr. 10, 1981 in the names of Hettinger et al for "Large Pore Catalyst for Heavy Hydrocarbon Conversion".

International Application Ser. No. PCT/US81/00646, filed May 13, 1981 in the names of McKay et al for "Stripping Hydrocarbons from Catalyst with Combustion Gases".

International Application Ser. No. PCT/US81/00648, filed May 13, 1981 in the names of Busch et al for "A Combination Process for Upgrading Residual Oils".

International Application Ser. No. PCT/US81/00660, filed May 13, 1981 in the name of Oliver J. Zandona for "Progressive Flow Cracking of Coal/Oil Mixtures with High Metals Content Catalsyt".

International Application Ser. No. PCT/US81/00662, filed May 13, 1981 in the names of Hettinger et al for "Steam Reforming of Carbo-Metallic Oils".

U.S. patent application Ser. No. 290,277 (now U.S. Pat. No. 4,425,259), filed Aug. 5, 1981 in the names of William P. Hettinger et al for "Endothermic Removal of Coke Deposited on Catalytic Material During Carbo-Metallic Oil Conversion".

U.S. patent application Ser. No. 295,335 (now U.S. Pat. No. 4,405,445), filed Aug. 24, 1981 in the names of Stephen M. Kovach et al for "Homogenation of Water and Reduced Crude".

TECHNICAL FIELD

This invention relates to processes for converting heavy hydrocarbon oils into lighter fractions, and especially to processes for converting heavy hydrocarbons containing high concentrations of coke precursors and heavy metals into gasoline and other liquid hydrocarbon fuels.

BACKGROUND ART

In general, gasoline and other liquid hydrocarbon fuels boil in the range of about 100° to about 650° F. However, the crude oil from which these fuels are made contains a diverse mixture of hydrocarbons and other compounds which vary widely in molecular weight and therefore boil over a wide range. For example, crude oils are known in which 30 to 60% or more of the total volume of oil is composed of compounds boiling at temperatures above 650° F. Among these are crudes in which about 10% to about 30% or more of the total volume consists of compounds so heavy in molecular weight that they boil above 1025° F. or at least will not boil below 1025° F. at atmospheric pressure.

Because these relatively abundant high boiling components of crude oil are unsuitable for inclusion in gasoline and other liquid hydrocarbon fuels, the petroleum refining industry has developed processes for cracking or breaking the molecules of the high molecular weight, high boiling compounds into smaller molecules which do boil over an appropriate boiling range. The cracking process which is most widely used for this purpose is known as fluid catalytic cracking (FCC). Although the FCC process has reached a highly advanced state, and many modified forms and variations have been developed, their unifying factor is that a vaporized hydrocarbon feedstock is caused to crack at an elevated temperature in contact with a cracking catalyst that is suspended in the feedstock vapors. Upon attainment of the desired degree of molecular weight and boiling point reduction the catalyst is separated from the desired products Crude oil in the natural state contains a variety of materials which tend to have quite troublesome effects on FCC processes, and only a portion of these troublesome materials can be economically removed from the crude oil. Among these troublesome materials are coke precursors (such as asphaltenes, polynuclear aromatics, etc.), heavy metals (such as nickel, vanadium, iron, copper, etc.), lighter metals (such as sodium, potassium, etc.), sulfur, nitrogen and others. Certain of these, such as the lighter metals, can be economically removed by desalting operations, which are part of the normal procedure for pretreating crude oil for fluid catalytic cracking. Other materials, such as coke precursors, asphaltenes and the like, tend to break down into coke during the cracking operation, which coke deposits on the catalyst, impairing contact between the hydrocarbon feedstock and the catalyst, and generally reducing its potency or activity level. The heavy metals transfer almost quantitatively from the feedstock to the catalyst surface.

If the catalyst is reused again and again for processing additional feedstock, which is usually the case, the heavy metals can accumulate on the catalyst to the point that they unfavorably alter the composition of the catalyst and/or the nature of its effect upon the feedstock. For example, vanadium tends to form fluxes with certain components of commonly used FCC catalysts, lowering the melting point of portions of the catalyst particles sufficiently so that they begin to sinter and become ineffective cracking catalysts. Accumulations of vanadium and other heavy metals, especially nickel, also "poison" the catalyst. They tend in varying degrees to promote excessive dehydrogenation and aromatic condensation, resulting in excessive production of carbon and gases with consequent impairment of liquid fuel yield. An oil such as a crude or crude fraction or other oil that is particularly abundant in nickel and/or other metals exhibiting similar behavior, while containing relatively large quantities of coke precursors, is referred to herein as a carbo-metallic oil, and represents a particular challenge to the petroleum refiner.

In general, the coke-forming tendency or coke precursor content of an oil can be ascertained by determining the weight percent of carbon remaining after a sample of that oil has been pyrolyzed. The industry accepts this value as a measure of the extent to which a given oil tends to form non-catalytic coke when employed as feedstock in a catalytic cracker. Two established tests are recognized, the Conradson Carbon and Ramsbottom Carbon tests, the former being described in ASTM D189-76 and the latter being described in ASTM Test No. D524-76. In conventional FCC practice, Conradson carbon values on the order of about 0.05 to about 1.0 are regarded as indicative of acceptable feed.

Since the various heavy metals are not of equal catalyst poisoning activity, it is convenient to express the poisoning activity of an oil containing a given poisoning metal or metals in terms of the amount of a single metal which is estimated to have equivalent poisoning activity. Thus, the heavy metals content of an oil can be expressed by the following formula (patterned after that of W. L. Nelson in *Oil and Gas Journal*, page 143, Oct. 23, 1961) . in which the content of each metal present is expressed in parts per million of such metal, as metal, on a weight basis, based on the weight of feed:

$$\text{Nickel Equivalents} = \text{Ni} + \frac{V}{4.8} + \frac{Fe}{7.1} + \frac{Cu}{1.23}$$

According to conventional FCC practice, the heavy metal content of feedstock for FCC processing is controlled at a relatively low level, e.g., about 0.25 ppm Nickel Equivalents or less.

The above formula can also be employed as a measure of the accumulation of heavy metals on cracking catalyst, except that the quantity of metal employed in the formula is based on the weight of catalyst (moisture free basis) instead of the weight of feed. In conventional FCC practice, in which a circulating inventory of catalyst is used again and again in the processing of fresh feed, with periodic or continuing minor addition and withdrawal of fresh and spent catalyst, the metal content of the catalyst is maintained at a level which may for example be in the range of about 200 to about 600 ppm Nickel Equivalents.

Petroleum refiners have been investigating means for processing reduced crudes, such as by visbreaking, solvent deasphalting, hydrotreating, hydrocracking, coking, Houdresid fixed bed cracking, H-Oil, and fluid catalytic cracking. Other approaches to the processing of reduced crude to form transportation and heating fuels named Reduced Crude Conversion (RCC) after a particularly common and useful carbo-metallic feed are disclosed in U.S. patent application Ser. Nos. 94,216, 94,217, 94,091, 94,227 and 94,092 all filed on Nov. 14, 1979, and which are incorporated herein by reference thereto. In carrying out the processes of these applications, a reduced crude is contacted with a hot regenerated catalyst in a short contact time riser cracking zone, and the catalyst and products are separated instantaneously by means of a vented riser to take advantage of the difference between the momentum of gases and catalyst particles. The catalyst is stripped, sent to a regenerator zone and the regenerated catalyst is recycled back to the riser to repeat the cycle. Due to the high Conradson carbon values of the feed, coke deposition on the catalyst is high and can be as high as 12 wt % based on feed. This high coke level can lead to excessive temperatures in the regenerator, at times in excess of 1400° F. to as high as 1500° F., which can lead to rapid deactivation of the catalyst through hydrothermal degradation of the active cracking component of the catalyst (crystalline aluminosilicate zeolites) and unit metallurgical failure.

As described in the above-mentioned co-pending reduced crude patent applications, excessive heat generated in the regenerator is overcome by heat management through utilization of a two-stage regenerator, regeneration of a high $CO/CO_2$ ratio to take advantage of the lower heat of combustion of C to CO versus CO to $CO_2$, low feed and air preheat temperatures and water addition in the riser as a catalyst coolant.

Various embodiments of regenerators and processes of regeneration useful in processing reduced crudes are described in the above-identified U.S. patent applications, including patent application Ser. Nos. 228,393, 246,751, 246,782, 258,265 and 290,277, and the material in these applications including that relating to regeneration of catalyst is hereby incorporated by reference.

As will be appreciated the carbo-metallic oils can vary widely in their Conradson carbon content. Such varying content of carbon residue in the feedstock, along with variations in riser operating conditions such as catalyst-to-oil ratio and others, can result in wide variations of the percent coke found on the spent catalyst.

In typical VGO operations employing a zeolite-containing catalyst in an FCC unit the amount of coke deposited on the catalyst averages about 4-5 wt % of feed. This coke production has been attributed to four different coking reactions, namely, contaminant coke (from metal deposits), catalytic coke (acid site cracking), entrained hydrocarbons (pore structure adsorption—poor stripping) and Conradson carbon. In the case of processing higher boiling fractions, e.g., reduced crudes, residual fractions, topped crude, etc., the coke production based on feed is the sum of the four kinds mentioned above including exceedingly high Conradson carbon values.

In addition, it has been proposed that two other types of coke-forming processes or mechanisms may be present in reduced crude processing in addition to the four exhibited by VGO. They are adsorbed and absorbed high boiling hydrocarbons not removed by normal efficient stripping due to their high boiling points, and carbon associated with high molecular weight nitrogen compounds adsorbed on the catalyst's acid sites.

This carbonaceous material is principally a carbonaceous, hydrogen-containing product as previously described plus high boiling adsorbed hydrocarbons with boiling points as high as 1500°–1700° F. that have a high hydrogen content, high boiling nitrogen containing hydrocarbons and porphorines-asphaltenes.

Coke production when processing reduced crude is normally and most generally about 4-5% plus the Conradson carbon value of the feedstock. As the Conradson carbon value of the feedstock increases, coke production increases and this increased load will raise regeneration temperatures. However, at adiabatic conditions, a limit exists on the Conradson carbon value of the feed which can be tolerated at approximately about 8 even at these higher temperatures. Based on experience, this equates to about 12–13 wt % code on catalyst based on feed.

That portion of the carbo-metallic feed which is not vaporizable at the temperatures encountered in the reactor tends to deposit as a liquid on the surfaces of the catalyst particles and is carried with the catalyst to the subsequent stages of the process. Steam stripping of adsorbed and absorbed gaseous hydrocarbons from the catalyst before it is introduced into the regenerator reduces the amount of material burned and heat produced within the regenerator. However, the high-boiling liquid constituents on the catalyst are not removed to a significant extent by conventional stripping techniques, and they contribute a significant amount of heat load to the regenerator, especially where the amount of material in feed which does not boil below about 1025° F. exceeds about 10%. Some feeds may contain as much as 20% or even as much as 40% or 60% of material which does not boil below about 1025° F. These high concentrations of high boiling point materials not only can place a high heat load on the regenerator, but their potential value as a liquid fuel or source of chemicals is lost by burning them in a regenerator.

SUMMARY OF THE INVENTION

It is accordingly one object of this invention to provide an improved process for converting carbo-metallic oils to liquid fuels.

It is another object to provide a process for converting carbometallic oils containing material which will not boil below about 1025° F. to liquid fuels wherein the amount of coke on the catalyst sent to the regenerator is reduced.

It is another object to provide a process for converting carbometallic oils to liquid fuels wherein at least a portion of high boiling hydrocarbon deposited on catalyst particles is removed from the spent catalyst and cracked into lighter products.

It is yet another object to provide a process for converting carbo-metallic oils containing at least about 10% by weight of materials which will not boil below about 1025° F. to fuels, wherein high-boiling materials not vaporizable at temperatures within the reactor, and which deposits on the catalyst, are removed from the catalyst as hydrocarbons.

In accordance with this invention a process is provided for converting carbo-metallic oils to lighter products comprising providing a converter feed containing 650° F.+ material, said 650+ material being characterized by a carbon residue on pyrolysis of at least about 1 and by containing at least about 4 parts per million of nickel equivalents of heavy metals; bringing said converter feed together with particulate cracking catalyst to form a stream comprising a suspension of said catalyst in said feed and causing the resultant stream to flow through a progressive flow reactor having an elongated reaction chamber which is at least in part vertical or inclined for a predetermined vapor residence time in the range of about 0.5 to about 10 seconds at a temperature of about 900° to about 1400° F. and under a pressure of about 10 to about 40 pounds per square inch absolute sufficient for causing a conversion per pass in the range of about 50% to about 90% while providing coke in amounts in the range of about 6 to about 14% by weight based on fresh feed, and laying down coke on the catalyst in amounts in the range of about 0.3 to about 3% by weight; separating spent, coke-laden catalyst from the gaseous stream of hydrocarbons formed by vaporized feed and resultant cracking products; providing hot regenerated catalyst and bringing said hot regenerated catalyst together with said spent catalyst in order to raise the temperature of said catalyst above the exiting temperature of the reactor, said regenerated catalyst being at a higher temperature than said spent catalyst, suspending the mixture of regenerated and spent catalyst in a gas and causing the resultant suspension to flow through a first stripping zone comprising an elongated chamber, which is at least in part vertical or inclined, for a residence time sufficient to cause at least a part of the hydrocarbons of said spent catalyst to be removed; separating the resulting mixture of regenerated and spent catalyst from the gaseous stream containing hydrocarbons; introducing the separated mixture of regenerated and spent catalyst into a second stripping zone where said mixture is contacted with a stripping gas and separating the resulting stripped catalyst from the resulting gases; introducing the stripped mixture of catalyst into a regeneration zone where it is contacted with an oxygen-containing, combustion-supporting gas under conditions of time, temperature and atmosphere sufficient to reduce the coke on said catalyst to about 0.25 percent or less while forming combustion products comprising CO and $CO_2$; and recycling a portion of the resulting regenerated catalyst into contact with spent catalyst.

Apparatus provided for carrying out this process, referred to herein as a riser-stripper, comprises an elongated gas-solids contact chamber provided with spent catalyst, regenerated catalyst, and gas inlet conduits at the lower portion thereof, means at the upper portion thereof for separating gases and catalyst, means for transferring catalyst to a regenerator, and means for transferring gases containing stripped and/or cracked hydrocarbons for admixture with hydrocarbons from a cracking reactor.

In accordance with the process of this invention there are many advantages over the prior art which include the following:

(1) Normal stripping operations, as practiced in the art, employ 400°-600° F. steam to remove (strip) the interstitial gaseous material from between the catalyst particles. The process of this invention removes from the catalyst pores heavy, high boiling carbonaceous material absorbed or adsorbed within the catalyst particles.

(2) Some of the heavy materials removed by the stripping process of this invention are metallo-porphyrins and metalloasphaltens. Removal of these metallohydrocarbons reduces the amount and rate of metal deposition on the catalyst which increases catalyst life as to metal deactivation rate and total metal content of the catalyst. This in turn will reduce the catalyst makeup rate required to maintain catalyst activity and total metals inventory on the catalyst.

(3) At least a portion of the heavy high boiling hydrocarbons stripped from the catalyst are cracked into lighter products and can be added to the products from the reactor, thus increasing the yield and selectivity of the process. The process and apparatus described herein not only reduce the amount of high-boiling hydrocarbons on the spent catalyst, thus reducing the heat load on the regenerator, but also increase the amount of liquid fuels produced. The hot regenerated catalyst vaporizes at least a portion of the high-boiling hydrocarbons, sorbed on the spent catalyst, and is sufficiently catalytically active to convert at least a portion of the vaporized hydrocarbons to lowerboiling material as, for example, gasoline.

Carbo-metallic oils containing high concentrations of heavy metals and high concentrations of materials which do not boil below about 1025° F. are advantageously converted into lighter products by this process. The concentration of heavy metals may exceed 10, or 20 or even 50 or 100 ppm Nickel equivalents of heavy metals, and this invention is useful in processing carbo-metallic feeds wherein the heavy metal consists wholly or in part of nickel and vanadium, and is especially useful for feeds wherein the nickel plus vanadium content is from about 20 to about 80 percent of the total heavy metal content. The heavy metal content may be substantially all vanadium or substantially all nickel, and this process is especially useful for feeds containing both vanadium and nickel in a ratio from about 1:3 to about 5:1.

The feed may suitably contain high-boiling nitrogen-containing compounds, as for example, basic nitrogen compounds, which, for example, may be present in the feed in concentrations of from less than about 10 ppm to over about 1000 ppm nitrogen.

The high boiling portion may be in any concentration; however, this invention is especially useful in processing feeds containing more than about 10% of material which will not boil below 1025° F., and carbo-metallic oils containing more than 20%, more than 40% and even more than 60% of material which will not boil below about 1025° F. may be used as a feed for this process of the invention. Those feeds having a high concentration, such as greater than about 20% of material which will not boil below about 1025° F. may contain as much as about 30 percent of material which will not boil below about 1300° F. and as much as 10 percent or more of material which will not boil below about 1500° F.

Spent catalyst, after cracking a carbo-metallic oil and before stripping, may contain high-boiling hydrocarbons in an amount from about 10 up to about 66 percent or higher by weight of the carbonaceous material on the catalyst. In the preferred method of carrying out this invention the concentration of high-boiling hydrocarbons is reduced as low as possible, preferably to less than about 0.1 percent by weight, and most preferably to less than about 0.05 percent by weight of the carbonaceous material.

In carrying out this process a stream of spent catalyst from a cracking reactor is mixed with a stream of regenerated catalyst and a gas which lifts the catalyst mixture through the riser-stripper. The regenerated catalyst is provided at a temperature and in a quantity sufficiently high to vaporize at least a portion of the high-boiling hydrocarbons on the spent catalyst. The temperature of the regenerated catalyst may suitably be as low as about 1200° F. or less, but is preferably at least about 1250° F., more preferably is at least about 1300° F., and most preferably is at least about 1325° F.

The temperature difference between the regenerated and spent catalyst should be at least about 100° F., or even 200° F., and is preferably at least about 250° F., more preferably at least about 300° F., and most preferably is at least about 350° F.

The regenerated catalyst not only provides heat to the spent catalyst but also provides catalytically active sites for cracking the volatilized high-boiling hydrocarbons. The amount of regenerated catalyst used to supply the heat to the spent catalyst will typically be great enough to furnish an adequate amount of cracking sites; consequently, the heat needed and the temperature difference between regenerated and spent catalyst are typically the factors which establish the ratio of regenerated to spent catalyst. The regenerated catalyst is preferably present in the mixture in an amount from about 1 to about 10 times by weight, and most preferably is present in an amount from about 2 to about 5 times by weight of the spent catalyst. In the preferred method of carrying out this invention the amount of heat capable of being supplied from the regenerated to the spent catalyst, at equilibrium conditions is great enough to raise the temperature of the spent catalyst at least about 50° F. and more preferably at least about 100° F.

The gas introduced into the lower portion of the riser-stripper acts as a heat transfer medium to help transfer heat from the regenerator to the spent catalyst and lift the mixture of catalyst through the chamber. A gas such as, for example, hydrogen, nitrogen, methane, steam, carbon dioxide, and flue gas may be used. The temperature of the gas as introduced is preferably sufficiently high so that it has little or no cooling effect on the particles, is preferably at a higher temperature than the spent catalyst, and may be at a higher temperature than the regenerated catalyst, thus providing additional heat to the catalyst mixture. The temperature of the gas is preferably at least about 50° F. hotter than the spent catalyst. The gas flow rate must be high enough to suspend the catalyst particles and carry them upwardly through the riserstripper and yet provide a sufficient residence time for the catalyst for heat to be transferred from the regenerated to the spent catalyst. The residence time of the particles in the riser-stripper may range from about 1 to 20 seconds, is preferably in the range of about 1 to about 10 seconds and more preferably in the range from about 2 to about 5 seconds. The gas pressure may suitably range from about 15 psia to about 45 pounds per square inch absolute.

The density of the catalyst mixture in the riser stripper is preferably in the range of about 4 to about 20 pounds per cubic foot, and is more preferably in the range of about 5 to about 10 pounds per cubic foot.

The following table summarizes conditions in the riser-stripper.

TABLE I

| RISER-STRIPPER CONDITIONS | | |
|---|---|---|
| Parameter | Preferred Range | Most Preferred Range |
| Temp. Regenerated Cat. | 1200–1450° F. | 1250–1375° F. |
| Temp. Spent Cat. | 900–1100 | 950–1050° F. |
| Temp. Difference, Reg. Cat.-Spent Cat. ($\Delta T$) | 100–500° F. | 200–325° F. |
| Temp. of Cat. Mixture at exit | 1100–1400° F. | 1100–1250° F. |
| Temp. Lifting Gas at Inlet | 500–1400° F. | 900–1300° F. |
| Pressure Lifting Gas at Inlet | 15–45 psia | |
| Reg. Cat./Spent Cat., Wt. Ratio | 1–10 | 2–5 |
| Cat. Residence Time, Av. | 1–10 sec | 2–5 sec |
| MAT Relative Activity, Reg. Cat. | 50–80 | |
| Coke on Reg. Cat. | <0.2% | <0.05 |
| Coke on Spent Cat. | <2.0% | <1.5% |
| Coke on Mixture Reg. and Spent Cat. to Regenerator | <1.0 | <0.5% |

The stripping step may be practiced in a variety of types of equipment. However, the preferred apparatus is an elongated reaction chamber similar in configuration to that of the preferred vented riser reactor described in detail below. For example, the apparatus may include one or more inlets, preferably near the bottom of the chamber, for each of the spent and regenerated catalyst streams. The lifting gas may be introduced at one or more points near the bottom of the chamber and, if desired, at one or more points along the chamber.

It is preferred that the elongated chamber, or at least the major portion thereof, be more nearly vertical than horizontal, preferably have a length of at least about 20 feet, more preferably from about 40 to about 150 feet, and have a length-to-diameter ratio of at least about 10, and more preferably about 20 or 25 or more. The reactor can be of uniform diameter throughout, or may be provided with a continuous or step-wise increase in diameter along the path to maintain or vary the velocity of the gases and catalyst throughout the length of the chamber.

Most preferably, the elongated chamber is one which is capable of abruptly separating the gases from the catalyst at one or more points along its length. The preferred embodiment; described below in connection with the riser reactor, is a vented riser and includes means for at least a partial reversal of direction of the mixture of gas and product vapors upon discharge from the elongated chamber. One means for accomplishing this reversal of direction, described in detail below, is a cup-like member surrounding the elongated chamber at its upper end.

BEST AND OTHER ILLUSTRATIVE MODES FOR CARRYING OUT THE INVENTION

Figure 1:
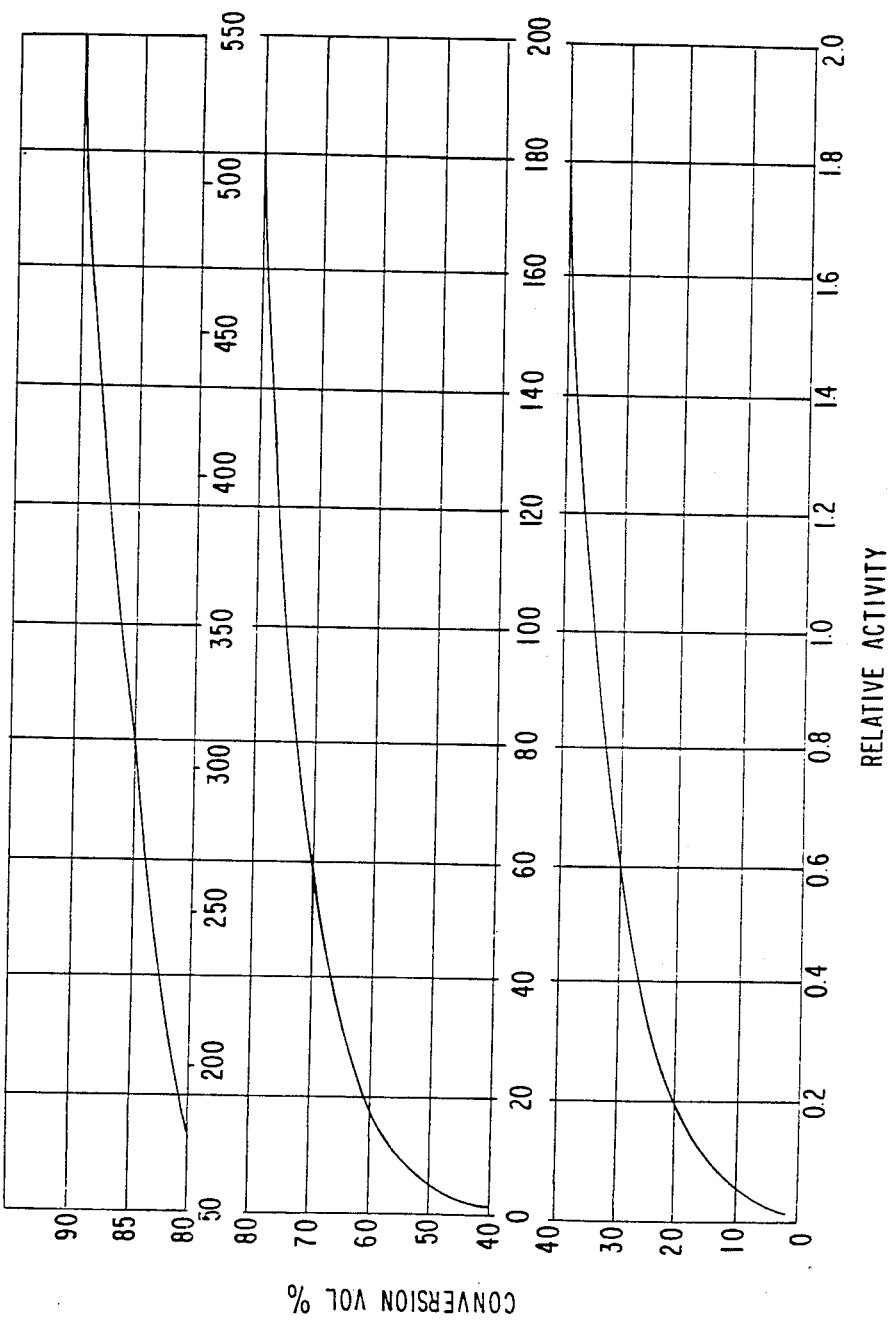
FIG. 1 is a graph showing the relationship between catalyst relative activity and volume percent MAT conversion.

The present invention is notable in providing a simple, relatively straightforward and highly productive approach to the conversion of carbo-metallic feed, such as reduced crude or the like, to various lighter products such as gasoline. The carbo-metallic feed comprises or is composed of oil which boils above about 650° F. Such oil, or at least the 650F+ portion thereof, is characterized by a heavy metal content of at least about 4, preferably more than about 5, and most preferably at least about 5.5 ppm of Nickel Equivalents by weight and by a carbon residue on pyrolysis of at least about 1% and more preferably at least about 2% by weight. In accordance with the invention, the carbo-metallic feed, in the form of a pumpable liquid, is brought into contact with hot conversion catalyst in a weight ratio of catalyst to feed in the range of about 3 to about 18 and preferably more than about 6.

The feed in said mixture undergoes a conversion step which includes cracking while the mixture of feed and catalyst is flowing through a progressive flow type reactor. The reactor includes an elongated reaction chamber which is at least partly vertical or inclined and in which the feed material, resultant products and catalyst are maintained in contact with one another while flowing as a dilute phase or stream for a predetermined riser residence time in the range of about 0.5 to about 10 seconds. The feed, catalyst, and other materials may be introduced into the reaction chamber at one or more points along its length.

The reaction is conducted at a temperature of about 900° to about 1400° F., measured at the reaction chamber exit, under a total pressure of about 10 to about 40 psia (pounds per square inch absolute) under conditions sufficiently severe to provide a conversion per pass in the range of about 50% or more and to lay down coke on the catalyst in an amount in the range of about 0.3 to about 3% by weight of catalyst and preferably at least about 0.5%. The overall rate of coke production, based on weight of fresh feed, is in the range of about 4 to about 14% by weight.

At the end of the predetermined residence time, the catalyst is separated from the products, is stripped to remove high boiling components and other entrained or adsorbed hydrocarbons and is then regenerated with oxygen-containing combustion-supporting gas under conditions of time, temperature and atmosphere sufficient to reduce the carbon on the regenerated catalyst to about 0.25% or less and preferably about 0.05% or less by weight.

Hydrocarbon Feed

This process is applicable to carbo-metallic oils whether of petroleum origin or not. For example, provided they have the requisite boiling range, carbon residue on pyrolysis and heavy metals content, the invention may be applied to the processing of such widely diverse materials as heavy bottoms from crude oil, heavy bitumen crude oil, those crude oils known as "heavy crude" which approximate the properties of reduced crude, shale oil, tar sand extract, products from coal liquification and solvated coal, atmospheric and vacuum reduced crude, extracts and/or bottoms (raffinate) from solvent deasphalting, aromatic extract from lube oil refining, tar bottoms, heavy cycle oil, slop oil, other refinery waste streams and mixtures of the foregoing. Such mixtures can for instance be prepared by mixing available hydrocarbon fractions, including oils, tars, pitches and the like. Also, powdered coal may be suspended in the carbo-metallic oil. A method of processing reduced crude containing coal fines is described in International Application No. PCT/US81/00660, filed May 13, 1981 in the name of Oliver J. Zandona and entitled "Progressive Flow Cracking of Coal/Oil Mixtures with High Metals Content Catalyst", and the disclosure of that application is hereby incorporated by reference.

Persons skilled in the art are aware of techniques for demetalation of carbo-metallic oils, and demetalated oils may be converted but the invention can employ as feedstock carbo-metallic oils that have had no prior demetalation treatment. Likewise, the invention can be applied to hydro-treated feedstocks or to carbo-metallic oils which have had substantially no prior hydrotreatment. However, the preferred application of the process is to reduced crude, i.e., that fraction of crude oil boiling at and above 650° F., along or in admixture with virgin gas oils. While the use of material that has been subjected to prior vacuum distillation is not excluded the invention can be used to satisfactorily process material which has had no prior vacuum distillation, thus saving on capital investment and operating costs as compared to conventional FCC processes that require a vacuum distillation unit.

In accordance with one aspect of the invention one provides a carbo-metallic oil feedstock, at least about 70%, more preferably at least about 85% and still more preferably about 100% (by volume) of which boils at and above about 600° F. All boiling temperatures herein are based on standard atmospheric pressure conditions. In carbo-metallic oil partly or wholly composed of material which boils at and above about 650° F., such material is referred to herein as 650° F.+ material; and 650+ material which is part of or has been separated from an oil containing component boiling above and below 650° may be referred to as a 650° + fraction. But the terms "boils above" and "650° F.+" are not intended to imply that all of the material characterized by said terms will have the capability of boiling. The carbometallic oils contemplated by the invention may contain material which may not boil under any conditions; for example, certain asphalts and asphaltenes may crack thermally during distillation, apparently without boiling. Thus, for example, when it is said that the feed comprises at least about 70% by volume of material which boils above about 650° F., it should be understood that the 70% in question may include some material which will not boil or volatilize at any temperature. These non-boilable materials when present, may frequently or for the most part be concentrated in portions of the feed which do not boil below about 1000° F., 1025° F. or higher. Thus, when it is said that at least about 10%, more preferably about 15%, and still more preferably at least about 20% (by volume) of the 650° F.+ fraction will not boil below about 1000° F. or 1025° F., it should be understood that all or any part of the material not boiling below about 100° or 1025° F., may not be volatile at and above the indicated temperatures.

Preferably, the contemplated feeds, or at least the 650° F.+ material therein, have a carbon residue on pyrolysis of at least about 2 or greater. For example, the Conradson carbon content may be in the range of about 2 to about 12 and most frequently at least about 4. A particularly common range is about 4 to about 8. Those feeds having a Conradson carbon content greater than about 6 may need special means for controlling excess heat in the regenerator.

Preferably, the feed has an average composition characterized by an atomic hydrogen to carbon ratio in the range of about 1.2 to about 1.9, and preferably about 1.3 to about 1.8.

The carbo-metallic feeds employed in accordance with the invention, or at least the 650° F.+ material therein, may contain at least about 4 parts per million of Nickel Equivalents, as defined above, of which at least about 2 parts per million is nickel (as metal, by weight). Carbometallic oils within the above range can be prepared from mixtures of two or more oils, some of which do and some of which do not contain the quantities of Nickel Equivalents and nickel set forth above. It should also be noted that the above values for Nickel Equivalents and nickel represent time-weighted averages for a substantial period of operation of the conversion unit, such as one month, for example. It should also be noted that the heavy metals have in certain circumstances exhibited some lessening of poisoning tendency after repeated oxidations and reductions on the catalyst, and the literature describes criteria for establishing "effective metal" values. For example, see the article by Cimbalo, et al., entitled "Deposited Metals Poison FCC Catalyst", *Oil and Gas Journal,* May 15, 1972, pp 112-122, the contents of which are incorporated herein by reference. If considered necessary or desirable, the contents of Nickel Equivalents and nickel in the carbo-metallic oils processed according to the invention may be expressed in terms of "effective metal" values. Notwithstanding the gradual reduction in poisoning activity noted by Cimbalo, et al., the regeneration of catalyst under normal FCC regeneration conditions may not, and usually does not, severely impair the dehydrogenation, demethanation and aromatic condensation activity of heavy metals accumulated on cracking catalyst.

It is known that about 0.2 to about 4 weight percent of "sulfur" in the form of elemental sulfur and/or its compounds (but reported as elemental sulfur based on the weight of feed) appears in FCC feeds and that the sulfur and modified forms of sulfur can find their way into the resultant gasoline product and, where lead is added, tend to reduce its suceptibility to octane enhancement. Sulfur in the product gasoline often requires sweetening when processing high sulfur containing crudes. To the extent that sulfur is present in the coke, it also represents a potential air pollutant since the regenerator burns it to $SO_2$ and $SO_3$. However, we have found that in our process the sulfur in the feed is on the other hand able to inhibit heavy metal activity by maintaining metals such as Ni, V, Cu and Fe in the sulfide form in the reactor. These sulfides are much less active than the metals themselves in promoting dehydrogenation and coking reactions. Accordingly, it is acceptable to carry out the invention with a carbo-metallic oil having at least about 0.3%, acceptably more than about 0.8% and more acceptably at least about 1.5% by weight of sulfur in the 650° F.+ fraction. A method of reducing pollutants from sulfur is described in copending U.S. patent application Ser. No. 255,965, filed Apr. 20, 1981 in the name of Stephen M. Kovach for "A Method for the Disposal of Sulfur Oxides from a Catalytic Cracking Operation".

The carbo-metallic oils useful in the invention may and usually do contain significant quantities of heavy, high boiling compounds containing nitrogen, a substantial portion of which may be basic nitrogen. For example, the total nitrogen content of the carbo-metallic oils may be at least about 0.05% by weight. Since cracking catalysts owe their cracking activity to acid sites on the catalyst surface or in its pores, basic nitrogen-containing compounds may temporarily neutralize these sites, poisoning the catalyst. However, the catalyst is not permanently damaged since the nitrogen can be burned off the catalyst during regeneration, as a result of which the acidity of the active sites is restored.

The carbo-metallic oils may also include significant quantities of pentane insolubles, for example at least about 0.5% by weight, and more typically 2% or more or even about 4% or more. These may include for instance asphaltenes and other materials.

Alkali and alkaline earth metals generally do not tend to vaporize in large quantities under the distillation conditions employed in distilling crude oil to prepare the vacuum gas oils normally used as FCC feedstocks. Rather, these metals remain for the most part in the "bottoms" fraction (the non-vaporized high boiling portion) which may for instance be used in the production of asphalt or other by-products. However, reduced crude and other carbo-metallic oils are in many cases bottoms products, and therefore may contain significant quantities of alkali and alkaline earth metals such as sodium. These metals deposit upon the catalyst during cracking. Depending on the composition of the catalyst and magnitude of the regeneration temperatures to which it is exposed, these metals may undergo interactions and reactions with the catalyst (including the catalyst support) which are not normally experienced in processing VGO under conventional FCC processing conditions. If the catalyst characteristics and regeneration conditions so require, one will of course take the necessary precautions to limit the amounts of alkali and alkaline earth metal in the feed, which metals may enter the feed not only as brine associated with the crude oil in its natural state, but also as components of water or steam which are supplied to the cracking unit. Thus, careful desalting of the crude used to prepare the carbo-metallic feed may be important when the catalyst is particularly susceptible to alkali and alkaline earth metals. In such circumstances, the content of such metals (hereinafter collectively referred to as "sodium") in the feed can be maintained at about 1 ppm or less, based on the weight of the feedstock. Alternatively, the sodium level of the feed may be keyed to that of the catalyst, so as to maintain the sodium level of the catalyst which is in use substantially the same as or less than that of the replacement catalyst which is charged to the unit.

According to a particularly preferred embodiment of the invention, the carbo-metallic oil feedstock constitutes at least about 70% by volume of material which boils above about 650° F., and at least about 10% of the material which boils above about 650° F. will not boil below about 1025° F. The average composition of this 650° F.+ material may be further characterized by: (a)' an atomic hydrogen to carbon ratio in the range of about 1.3 to about 1.8; (b) Conradson carbon value of at least about 2; (c) at least about four parts per million of Nickel Equivalents, as defined above, of which at least about two parts per million is nickel (as metal, by weight); and (d) at least one of the following: (i) at least about 0.3% by weight of sulfur, (ii) at least about 0.5% by weight of pentane insolubles. Very commonly, the preferred feed with include all of (i), (ii), and other components found in oils of petroleum and nonpetroleum origin may also be present in varying quantities providing they do not prevent operation of the process.

Although there is no intention of excluding the possibility of using a feedstock which has previously been subjected to some cracking, the present invention can be used to successfully produce large conversions and very substantial yields of liquid hydrocarbon fuels from carbo-metallic oils which have not been subjected to any substantial amount of cracking. Thus, for example, and preferably, at least about 85%, more preferably at least about 90% and most preferably substantially all of the carbo-metallic feed introduced into the present process is oil which has not previously been contacted with cracking catalyst under cracking conditions Moreover, the process of the invention is suitable for operation in a substantially once-through or single pass mode Thus, the volume of recycle, if any, based on the volume of fresh feed is preferably about 15% or less and more preferably about 10% or less.

The invention described in this specification may be employed in the processes and apparatuses for carbo-metallic oil conversion described in co-pending U.S. application Ser. Nos. 94,091, 94,092, 94,216, 94,217 and 94,227, all filed Nov. 14, 1979; and Ser. Nos. 246,751, and 246,791, all filed Mar. 23, 1981; said applications being in the name of George D. Myers alone or jointly with Lloyd E. Busch and assigned or to be assigned to Ashland Oil, Inc., and the entire disclosure of each of said applications being incorporated herein by reference. While the processes described in these applications can handle reduced crudes or crude oils containing high metals and Conradson carbon values not susceptible previously to direct processing, certain crudes such as Mexican Mayan or Venezuelan and certain other types of oil feeds contain abnormally high heavy metals and Conradson carbon values. If these very poor grades of oil are processed in a carbo-metallic process, they may lead to uneconomical operations because of high heat loads on the regenerator and/or high catalyst addition rates to maintain adequate catalyst activity and/or selectivity. In order to improve the grade of very poor grades of oil, such as those containing more than 50 ppm heavy metals and/or more than 10 weight percent Conradson carbon, these oils may be pretreated with a sorbent to reduce the levels of these contaminants to the aforementioned or lower values. Such upgrading processes are described in U.S. Pat. No. 4,263,128 of Apr. 21, 1981, in the name of David B. Bartholic, the entire disclosure of said patent being incorporated herein by reference.

CATALYST

In general, the weight ratio of catalyst to fresh feed (feed which has not previously been exposed to cracking catalyst under cracking conditions) used in the process is in the range of about 3 to about 18. Preferred and more preferred ratios are about 4 to about 12, more preferably about 5 to about 10 and still more preferably about 6 to about 10, a ratio of about 1.0 presently being considered most nearly optimum. Within the limitations of product quality requirements, controlling the catalyst to oil ratio at relatively low levels within the aforesaid ranges tends to reduce the coke yield of the process, based on fresh feed.

In conventional FCC processing of VGO, the ratio between the number of barrels per day of plant throughput and the total number of tons of catalyst undergoing circulation throughout all phases of the process can vary widely. For purposes of this disclosure, daily plant throughput is defined as the number of barrels of fresh feed boiling above about 650° F. which that plant processes per average day of operation to liquid products boiling below about 430° F.

The present invention may be practiced in the range of about 2 to about 30 tons of catalyst inventory per 1000 barrels of daily plant throughput. Based on the objective of maximizing contact of feed with fresh catalyst, it has been suggested that operating with about 2 to about 5 or even less than 2 tons of catalyst inventory per 1000 barrels of daily plant throughput is desirable when operating with carbo-metallic oils. However, in view of disclosures in "Deposited Metals Poison FCC Catalyst", Cimbalo, et al., op ct., one may be able, at a given rate of catalyst replacement, to reduce effective metals levels on the catalyst by operating with a higher inventory, say in the range of about 12 to about 20 tons per 1000 barrels of daily throughput capacity.

In the practice of the invention, catalyst may be added continuously or periodically, such as, for example to make up for normal losses of catalyst from the system. Moreover, catalyst addition may be conducted in conjunction with withdrawal of catalyst, such as, for example, to maintain or increase the average activity level of the catalyst in the unit. For example, the rate at which virgin catalyst is added to the unit may be in the range of about 0.1 to about 3, more preferably about 0.15 to about 2, and most preferably about 0.2 to about 1.5 pounds per barrel of feed. If on the other hand equilibrium catalyst from FCC operation is to be utilized, replacement rates as high as about 5 pounds per barrel can be practiced.

Where circumstances are such that the catalyst employed in the unit is below average in resistance to deactivation and/or conditions prevailing in the unit are such as to promote more rapid deactivation, one may employ rates of addition greater than those stated above; but in the opposite circumstances, lower rates of addition may be employed. By way of illustration, if a unit were operated with a metal(s) loading of 5000 ppm Ni+V in parts by weight on equilibrium catalyst, one might for example employ a replacement rate of about 2.7 pounds of catalyst introduced for each barrel (42 gallons) of feed processed.

However, operation at a higher level such as 10,000 ppm Ni+V on catalyst would enable one to substantially reduce the replacement rate, such as for example to about 1.3 pounds of catalyst per barrel of feed Thus, the levels of metal(s) on the catalyst and catalyst replacement rates may in general be respectively increased and decreased to any value consistent with the catalyst activity which is available and desired for conducting the process.

U.S. patent application Ser. No. 263,396 filed May 13, 1981 in the names of William P. Hettinger, Jr. et al for "Magnetic Separation of High Activity Catalyst From Low Activity Catalyst" discloses a method of reducing the rate of replacing catalyst and the entire disclosure of said application is hereby incorporated by reference.

Without wishing to be bound by any theory, it appears that a number of features of the process to be described in greater detail below, such as, for instance, the residence time and optional mixing of steam with the feedstock, tend to restrict the extent to which cracking conditions produce metals in the reduced state on the catalyst from heavy metal sulfide(s), sulfate(s) or oxide(s) deposited on the catalyst particles by prior exposures of carbometallic feedstocks and regeneration conditions. Thus, the process appears to afford significant control over the poisoning effect of heavy metals on the catalyst even when the accumulations of such metals are quite substantial.

Accordingly, the process may be practiced with catalyst bearing accumulations of heavy metal(s) in the form of elemental metal(s), oxide(s), sulfide(s) or other compounds which heretofore would have been considered quite intolerable in conventional FCC-VGO operations. Thus, operation of the process with catalyst bearing heavy metals accumulations in the range of about 3,000 or more ppm Nickel Equivalents, on the average, is contemplated. The concentration of Nickel Equivalents of metals on catalyst can range up to about 40,000 ppm or higher. More specifically, the accumulation may be in the range of about 3,000 to about 30,000 ppm, preferably in the range of 3,000 to 20,000 ppm, and more preferably about 3,000 to about 12,000 ppm. Within these ranges just mentioned, operation at metals levels of about 4,000 or more, about 5,000 or more, or about 7,000 or more ppm can tend to reduce the rate of catalyst replacement required. The foregoing ranges are based on parts per million of Nickel Equivalents, in which the metals are expressed as metal, by weight, measured on and based on regenerated equilibrium catalyst. However, in the event that catalyst of adequate activity is available at very low cost, making feasible very high rates of catalyst replacement, the carbo-metallic oil could be converted to lower boiling liquid products with catalyst bearing less than 3,000 ppm Nickel Equivalents of heavy metals. For example, one might employ equilibrium catalyst from another unit, for example, an FCC unit which has been used in the cracking of a feed, e.g., vacuum gas oil, having a carbon residue on pyrolysis of less than 1 and containing less than about 4 ppm Nickel Equivalents of heavy metals.

In any event, the equilibrium concentration of heavy metals in the circulating inventory of catalyst can be controlled (including maintained or varied as desired or needed) by manipulation of the rate of catalyst addition discussed above. Thus, for example, addition of catalyst may be maintained at a rate which will control the heavy metals accumulation on the catalyst in one of the ranges set forth above.

In general, it is preferred to employ a catalyst having a relatively high level of cracking activity, providing high levels of conversion and productivity at low residence times. The conversion capabilities of the catalyst may be expressed in terms of the conversion produced during actual operation of the process and/or in terms of conversion produced in standard catalyst activity tests. For example, it is preferred to employ catalyst which, in the course of extended operation under prevailing process conditions, is sufficiently active for sustaining a level of conversion of at least about 50% and more preferably at least about 60%. In this connection, conversion is expressed in liquid volume percent, based on fresh feed.

Also, for example, the preferred catalyst may be defined as one which, in its virgin or equilibrium state, exhibits a specified activity expressed as a percentage in terms of MAT (micro-activity test) conversion. For purposes of the present invention the foregoing percentage is the volume percentage of standard feedstock which a catalyst under evaluation will convert to 430° F. end point gasoline, lighter products and coke at 900° F., 16 WHSV (weight hourly space velocity, calculated on a moisture free basis, using clean catalyst which has been dried at 1100° F., weighed and then conditioned, for a period of at least 8 hours at about 25° C. and 50% relative humidity, until about one hour or less prior to contacting the feed) and 3C/O (catalyst to oil weight ratio) by ASTM D-32 MAT test D-3907-80, using an appropriate standard feedstock, e.g. a sweet light primary gas oil, such as that used by Davison, Division of W. R. Grace, having the following analysis and properties:

| | |
|---|---|
| API Gravity at 60° F., degrees | 31.0 |
| Specific Gravity at 60° F., g/cc | 0.8708 |
| Ramsbottom Carbon, wt. % | 0.09 |
| Conradson Carbon, wt % | 0.04 |
| Carbon, wt. % | 84.92 |
| Hydrogen, wt. % | 12.94 |
| Sulfur, wt. % | 0.68 |
| Nitrogen, ppm | 305 |
| Viscosity at 100° F., centistokes | 10.36 |
| Watson K Factor | 11.93 |
| Aniline Point | 182 |
| Bromine No. | 2.2 |
| Paraffins, Vol. % | 31.7 |
| Olefins, Vol. % | 1.6 |
| Naphthenes, Vol. % | 44.0 |
| Aromatics, Vol. % | 22.7 |
| Average Molecular Weight | 284 |
| Nickel | Trace |
| Vanadium | Trace |
| Iron | Trace |
| Sodium | Trace |
| Chlorides | Trace |
| B S & W | Trace |
| Distillation | ASTM D-1160 |
| IBP | 445 |
| 10% | 601 |
| 30% | 664 |
| 50% | 701 |
| 70% | 734 |
| 90% | 787 |
| FBP | 834 |

The gasoline end point and boiling temperature-volume percent relationships of the product produced in the MAT conversion test may for example be determined by simulated distillation techniques, for example modifications of gas chromatographic "Sim-D", ASTM D-2887-73. The results of such simulations are in reasonable agreement with the results obtained by subjecting larger samples of material to standard laboratory distillation techniques. Conversion is calculated by subtracting from 100 the volume percent (based on fresh feed) of those products heavier than gasoline which remain in the recovered product.

On pages 935–937 of Hougen and Watson, *Chemical Process Principles,* John Wiley & Sons, Inc., N.Y. (1947), the concept of "Activity Factors" is discussed. This concept leads to the use of "relative activity" to compare the effectiveness of an operating catalyst against a standard catalyst. Relative activity measurements facilitate recognition of how the quantity requirements of various catalysts differ from one another. Thus, relative activity is a ratio obtained by dividing the weight of a standard or reference catalyst which is or would be required to produce a given level of conversion, as compared to the weight of an operating catalyst (whether proposed or actually used) which is or would be required to produce the same level of conversion in the same or equivalent feedstock under the same or equivalent conditions. Said ratio of catalyst weights may be expressed as a numerical ratio, but preferably is converted to a percentage basis. The standard catalyst is preferably chosen from among catalysts useful for conducting the present invention, such as for example zeolite fluid cracking catalysts, and is chosen for its ability to produce a predetermined level of conversion in a standard feed under the conditions of temperature, WHSV, catalyst to oil ratio and other conditions set forth in the preceding description of the MAT conversion test and in ASTM D-32 MAT test D-3907-80. Conversion is the volume percentage of feedstock that is converted to 430° F. end point gasoline, lighter products and coke. For standard feed, one may employ the above-mentioned light primary gas oil, or equivalent.

For purposes of conducting relative activity determinations, one may prepare a "standard catalyst curve", a chart or graph of conversion (as above defined) vs. reciprocal WHSV for the standard catalyst and feedstock. A sufficient number of runs is made under ASTM D-3907-80 conditions (as modified above) using standard feedstock at varying levels of WHSV to prepare an accurate "curve" of conversion vs. WHSV for the standard feedstock. This curve should traverse all or substantially all of the various levels of conversion including the range of conversion within which it is expected that the operating catalyst will be tested. From this curve, one may establish a standard WHSV for test comparisons and a standard value of reciprocal WHSV corresponding to that level of conversion which has been chosen to represent 100% relative activity in the standard catalyst. For purposes of the present disclosure the aforementioned reciprocal WHSV and level of conversion are, respectively, 0.0625 and 75%. In testing an operating catalyst of unknown relative activity, one conducts a sufficient number of runs with that catalyst under D-3907-80 conditions (as modified above) to establish the level of conversion which is or would be produced with the operating catalyst at standard reciprocal WHSV. Then, using the above-mentioned standard catalyst curve, one establishes a hypothetical reciprocal WHSV constituting the reciprocal WHSV which would have been required, using the standard catalyst, to obtain the same level of conversion which was or would be exhibited, by the operating catalyst at standard WHSV. The relative activity may then be calculated by dividing the hypothetical reciprocal WHSV by the reciprocal standard WHSV, which is 1/16, or 0.0625. The result is relative activity expressed in terms of a decimal fraction, which may then be multiplied by 100 to convert to percent relative activity. In applying the results of this determination, a relative activity of 0.5, or 50%, means that it would take twice the amount of the operating catalyst to give the same conversion as the standard catalyst, i.e., the production catalyst is 50% as active as the reference catalyst.

Relative activity at a constant level of conversion is also equal to the ratio of the Weight Hourly Space Velocity (WHSV) of an operational or "test" catalyst divided by the WHSV of a standard catalyst selected for its level of conversion at MAT conditions. To simplify the calculation of relative activity for different test catalysts against the same standard catalyst, a MAT conversion versus relative activity curve may be developed. One such curve utilizing a standard catalyst of 75 volume percent conversion to represent 100 percent relative activity is shown in FIG. 1.

The catalyst may be introduced into the process in its virgin form or, as previously indicated, in other than virgin form; e.g. one may use equilibrium catalyst withdrawn from another unit, such as catalyst that has been employed in the cracking of a different feed. Whether characterized on the basis of MAT conversion activity or relative activity, the preferred catalysts may be described on the basis of their activity "as introduced" into the process of the present invention, or on the basis of their "as withdrawn" or equilibrium activity in the process of the present invention, or on both of these bases. A preferred activity level of virgin and non-virgin catalyst "as introduced" into the process of the present invention is at least about 60% by MAT conversion, and preferably at least about 20%, more preferably at least about 40% and still more preferably at least about 60% in terms of relative activity. However, it will be appreciated that, particularly in the case of non-virgin catalysts supplied at high addition rates, lower activity levels may be acceptable. An acceptable "as withdrawn" or equilibrium activity level of catalyst which has been used in the process of the present invention is at least about 20% or more, but about 40% or more and preferably about 60% or more are preferred values on a relative activity basis, and an activity level of 60% or more on a MAT conversion basis is also contemplated. More preferably, it is desired to employ a catalyst which will, under the conditions of use in the unit, establish an equilibrium activity at or above the indicated level. The catalyst activities are determined with catalyst having less than 0.01 coke, e.g. regenerated catalyst.

One may employ any hydrocarbon cracking catalyst having the above indicated conversion capabilities. A particularly preferred class of catalysts includes those which have pore structures into which molecules of feed material may enter for adsorption and/or for contact with active catalytic sites within or adjacent the pores. Various types of catalysts are available within this classification, including for example the layered silicates, e.g. smectites. Although the most widely available catalysts within this classification are the well-known zeolite-containing catalysts, non-zeolite catalysts are also contemplated.

The preferred zeolite-containing catalysts may include any zeolite, whether natural, semi-synthetic or synthetic, alone or in admixture with other materials which do not significantly impair the suitability of the catalyst, provided the resultant catalyst has the activity and pore structure referred to above. For example, if the virgin catalyst is a mixture, it may include the zeolite component associated with or dispersed in a porous refractory inorganic oxide carrier. In such case the catalyst may for example contain about 1% to about 60%, more preferably about 15 to about 50%, and most typically about 20 to about 45% by weight, based on the total weight of catalyst (water free basis) of the zeolite, the balance of the catalyst being the porous refractory inorganic oxide alone or in combination with any of the known adjuvants for promoting or suppressing various desired and undesired reactions. For a general explanation of the genus of zeolite, molecular sieve catalysts useful in the invention, attention is drawn to the disclosures of the articles entitled "Refinery Catalysts Are a Fluid Business" and "Making Cat Crackers Work on Varied Diet", appearing respectively in the July 26, 1978 and Sept. 13, 1978 issues of Chemical Week magazine. The descriptions of the aforementioned publications are incorporated herein by reference.

For the most part, the zeolite components of the zeolite-containing catalysts will be those which are known to be useful in FCC cracking processes. In general, these are crystalline aluminosilicates, typically made up of tetra coordinated aluminum atoms associated through oxygen atoms with adjacent silicon atoms in the crystal structure. However, the term "zeolite" as used in this disclosure contemplates not only aluminosilicates, but also substances in which the aluminum has been partly or wholly replaced, such as for instance by gallium and/or other metal atoms, and further includes substances in which all or part of the silicon has been replaced, such as for instance by germanium. Titanium and zirconium substitution may also be practiced.

Most zeolites are prepared or occur naturally in the sodium form, so that sodium cations are associated with the electro-negative sites in the crystal structure. The sodium cations tend to make zeolites inactive and much less stable when exposed to hydrocarbon conversion conditions, particularly high temperatures. Accordingly, the zeolite may be ion exchanged, and where the zeolite is a component of a catalyst composition, such ion exchanging may occur before or after incorporation of the zeolite as a component of the composition. Suitable cations for replacement of sodium in the zeolite crystal structure include ammonium (decomposable to hydrogen), hydrogen, rare earth metals, alkaline earth metals, etc. Various suitable ion exchange procedures and cations which may be exchanged into the zeolite crystal structure are well known to those skilled in the art.

Examples of the naturally occurring crystalline aluminosilicate zeolites which may be used as or included in the catalyst for the present invention are faujasite, mordenite, clinoptilote, chabazite, analcite, crionite, as well as levynite, dachiardite, paulingite, noselite, ferriorite, heulandite, scolccite, stibite, harmotome, phillipsite, brewsterite, flarite, datolite, gmelinite, caumnite, leucite, lazurite, scaplite, mesolite, ptolite, nephline, matrolite, offretite and sodalite.

Examples of the synthetic crystalline aluminosilicate zeolites which are useful as or in the catalyst for carrying out the present invention are Zeolite X, U.S. Pat. Nos. 2,882,244; Zeolite Y, 3,130,007; and Zeolite A, 2,882,243; as well as Zeolite B, 3,008,803; Zeolite D, Canadian Pat. Nos. 661,981; Zeolite E, 614,495; Zeolite F, U.S. Pat. Nos. 2,996,358; Zeolite H, 3,010,789; Zeolite J, 3,011,869; Zeolite L, Belgian Pat. No. 575,177; Zeolite M, U.S. Pat. Nos. 2,995,423; Zeolite O, 3,140,252; Zeolite Q, 2,991,151; Zeolite S, 3,054,657; Zeolite T, 2,950,952; Zeolite W, 3,012,853; Zeolite Z, Canadian Pat. Nos. 614,495; and Zeolite Omega, 817,915. Also, ZK-4HJ, alpha beta and ZSM-type zeolites are useful. Moreover, the zeolites described in U.S. Pat. Nos. 3,140,249; 3,140,253; 3,944,482; and 4,137,151 are also useful, the disclosures of said patents being incorporated herein by reference.

The crystalline aluminosilicate zeolites having a faujasite-type crystal structure are particularly preferred for use in the present invention. This includes particularly natural faujasite and Zeolite X and Zeolite Y.

The crystalline aluminosilicate zeolites, such as synthetic faujasite, will under normal conditions crystallize as regularly shaped, discrete particles of about one to about ten microns in size, and, accordingly, this is the size range frequently found in commercial catalysts which can be used in the invention. Preferably, the particle size of the zeolites is from about 0.1 to about 10 microns and more preferably is from about 0.1 to about 2 microns or less. For example, zeolites prepared in situ from calcined kaolin may be characterized by even smaller crystallites. Crystalline zeolites exhibit both an interior and exterior surface area, the latter being defined as "portal" surface area, with the largest portion of the total surface area being internal. By portal surface area, we refer to the outer surface of the zeolite crystal through which reactants are considered to pass in order to convert to lower boiling products. Blockages of the internal channels by, for example, coke formation, blockages of entrance to the internal channels by deposition of coke in the portal surface area, and contamination by metals poisoning, will greatly reduce the total zeolite surface area. Therefore, to minimize the effect of contamination and pore blockage, crystals larger than the normal size cited above are preferably not used in the catalysts of this invention.

Commercial zeolite-containing catalysts are available with carriers containing a variety of metal oxides and combination thereof, include for example silica, alumina, magnesia, and mixtures thereof and mixtures of such oxides with clays as e.g. described in U.S. Pat. No. 3,034,948. One may for example select any of the zeolite-containing molecular sieve fluid cracking catalysts which are suitable for production of gasoline from vacuum gas oils. However, certain advantages may be attained by judicious selection of catalysts having marked resistance to metals. A metal resistant zeolite catalyst is, for instance described in U.S. Pat. No. 3,944,482, in which the catalyst contains 1-40 weight percent of a rare earth-exchanged zeolite, the balance being a refractory metal oxide having specified pore volume and size distribution. Other catalysts described as "metals-tolerant" are described in the abovementioned Cimbala, et al., article.

In general, it is preferred to employ catalysts having an overall particle size in the range of about 5 to about 160, more preferably about 40 to about 120, and most preferably about 40 to about 80 microns. For example, a useful catalyst may have a skeletal density of about 150 pounds per cubic foot and an average particle size of about 60-70 microns, with less than 10% of the particles having a size less than about 40 microns and less than 80% having a size less than about 50-60 microns.

Although a wide variety of other catalysts, including both zeolite-containing and non-zeolite-containing may be employed in the practice of the invention the following are examples of commercially available catalysts which may be employed in practicing the invention:

TABLE II

| | Specific Surface $m^2/g$ | Zeolite Content | Weight Percent | | | | |
|---|---|---|---|---|---|---|---|
| | | | $Al_2O_3$ | $SiO_2$ | $Na_2O$ | $Fe_2O$ | $TiO_2$ |
| AGZ-290 | 300 | 11.0 | 29.5 | 59.0 | 0.40 | 0.11 | 0.59 |
| GRZ-1 | 162 | 14.0 | 23.4 | 69.0 | 0.10 | 0.4 | 0.9 |
| CCZ-220 | 129 | 11.0 | 34.6 | 60.0 | 0.60 | 0.57 | 1.9 |
| Super DX | 155 | 13.0 | 31.0 | 65.0 | 0.80 | 0.57 | 1.6 |
| F-87 | 240 | 10.0 | 44.0 | 50.0 | 0.80 | 0.70 | 1.6 |
| FOX-90 | 240 | 8.0 | 44.0 | 52.0 | 0.65 | 0.65 | 1.1 |
| HFZ 20 | 310 | 20.0 | 59.0 | 40.0 | 0.47 | 0.54 | 2.75 |
| HEZ 55 | 210 | 19.0 | 59.0 | 35.2 | 0.60 | 0.60 | 2.5 |

The AGZ-290, GRZ-1, CCZ-220 and Super DX catalysts referred to above are products of W. R. Grace and Co. F-87 and FOX-90 are products of Filtrol, while HFZ-20 and HEZ-55 are products of Engelhard-/Houdry. The above are properties of virgin catalyst and, except in the case of zeolite content, are adjusted to a water-free basis, i.e. based on material ignited at 1750° F. The zeolite content is derived by comparison of the X-ray intensities of a catalyst sample and of a standard material composed of high purity sodium Y zeolite in accordance with draft #6, dated Jan. 9, 1978, of proposed ASTM Standard Method entitled "Determination of the Faujasite Content of a catalyst".

Among the above-mentioned commercially available catalysts, the Super D family and especially a catalyst designated GRZ-1 are particularly preferred. For example, Super DX has given particularly good results with Arabian light crude. The GRZ-1, although substantially more expensive than the Super DX at present, appears somewhat more metalstolerant.

Although not yet commercially available, it is believed that the best catalysts for carrying out the present invention are those which are characterized by matrices with feeder pores having large minimum diameters and large mouths to facilitate diffusion of high molecular weight molecules through the matrix to the portal surface area of molecular sieve particles within the matrix. Such matrices preferably also have a relatively large pore volume in order to soak up unvaporized portions of the carbo-metallic oil feed. Thus, significant numbers of liquid hydrocarbon molecules can diffuse to active catalytic sites both in the matrix and in sieve particles on the surface of the matrix. In general, it is preferred to employ catalysts having a total pore volume greater than 0.2 cc/gm, preferably at least 0.4 cc/gm, more preferably at least 0.6 cc/gm and most preferably in the range of 0.7 to 1.0 cc/gm, and with matrices wherein at least 0.1 cc/gm, and preferably at least 0.2 cc/gm, of said total pore volume is comprised of feeder pores having diameters in the range of about 400 to about 6000 angstrom units, more preferably in the range of about 1000 to about 6000 angstrom units. These catalysts and the method for making the same are described more fully in copending International Application Ser. No. PCT/US81/00492 filed in the U.S. Receiving Office on Apr. 10, 1981, in the names of Ahsland Oil, Inc., et al., and entitled "Large Pore Catalysts for Heavy Hydrocarbon Conversion", the entire disclosure of said application being incorporated herein by reference.

Catalysts for carrying out the present invention may also employ other metal additives for controlling the adverse effects of vanadium as described in PCT International Application Ser. No. PCT/US81/00356 filed in the U.S. Receiving Office on Mar. 19, 1981, in the names of Ashland Oil, Inc., et al., and entitled "Immobilization of Vanadia Deposited on Catalytic Materials During Carbo-Metallic Oil Conversion". The manner in which these and other metal additives are believed to interact with vanadium is set forth in said PCT International Application, the entire disclosure of which is incorporated herein by reference. Certain of the additive metal compounds disclosed in this referenced PCT application, particularly those of titanium and zirconium, will also passivate nickel, iron and copper. The passivating mechanism of titanium and zirconium on nickel, iron and copper is believed to be similar to that of aluminum and silicon, namely, an oxide and/or spinel coating may be formed. Where the additive is introduced directly into the conversion process, that is into the riser, into the regenerator or into any intermediate components, the additive is preferably an organo-metallic compound of titanium or zirconium soluble in the hydrocarbon feed or in a hydrocarbon solvent miscible with the feed. Examples of preferred organo-metallic compounds of these metals are tetraisopropyl-titanate, Ti $(C_3H_7O)_4$, available as TYZOR from the Du Pont Company; zirconium isopropoxide, Zr $(C_3H_7O)_4$; and zirconium 2,4-pentanedionate-Zr $(C_5H_7O_2)_4$. These organo-metallics are only a partial example of the various types available and others would include alcoholates, esters, phenolates, naphthenates, carboxylates, dienyl sandwich compounds, and the like. Other preferred process additives include titanium tetrachloride, zirconium tetrachloride and zirconium acetate, and the water soluble inorganic salts of these metals, including the sulfates, nitrates and chlorides, which are relatively inexpensive.

Because the atomic weight of zirconium differs relative to the atomic weights of nickel and vanadium, while that of titanium is about the same, a 1:1 atomic ratio is equivalent to about a 1.0 weight ratio of titanium to nickel plus vanadium, and to about a 2.0 weight ratio of zirconium to nickel plus vanadium. Multiples of the 1:1 atomic ratio require the same multiple of the weight ratio. For example, a 2:1 atomic ratio requires about a 2.0 titanium weight ratio and about a 4.0 zirconium weight ratio.

Additives may be introduced into the riser, the regenerator or other conversion system components to passivate the non-selective catalytic activity of heavy metals deposited on the conversion catalyst. Preferred additives for practicing the present invention include those disclosed in U.S. patent application Ser. No. 263,395, filed May 13, 1981 in the name of William P. Hettinger, Jr., and entitled PASSIVATING HEAVY METALS IN CARBO-METALLIC OIL CONVERSION, the entire disclosure of said U.S. application being incorporated herein by reference.

A particularly preferred catalyst also includes vanadium traps as disclosed in U.S. patent application Ser. No. 252,967 filed Apr. 10, 1981, in the names of William P. Hettinger, Jr., et al., and entitled "Trapping of Metals Deposited on Catalytic Materials During Carbo-Metallic Oil Conversion". It is also preferred to control the valence state of vanadium accumulations on the catalyst during regeneration as disclosed in the U.S. patent application Ser. No. 255,398 entitled "Immobilization of Vanadium Deposited on Catalytic Materials During Carbo-Metallic Oil Conversion" filed in the names of William P. Hettinger, Jr., et al., on Apr. 20, 1981, as well as the continuation-in-part of the same application, Ser. No. 258,265 subsequently filed on Apr. 28, 1981. The entire disclosures of said U.S. patent applications are incorporated herein by reference.

A catalyst which is particularly useful in processes for converting carbo-metallic oils containing high concentrations of high boiling constituents is disclosed in U.S. patent application Ser. No. 263,391 filed May 13, 1981 in the names of William P. Hettinger et al., and entitled "Process for Cracking High Boiling Hydrocarbons Using High Pore Volume, Low Density Catalyst". The entire disclosure of said application is hereby incorporated by reference. It is considered an advantage that the process of the present invention can be conducted in the substantial absence of tin and/or antimony or at least in the presence of a catalyst which is substantially free of either or both of these metals.

SUPPLEMENTAL MATERIALS ADDED TO REACTOR

The process of the present invention may be operated with the above described carbo-metallic oil and catalyst as substantially the sole materials charged to the reaction zone, although charging of additional materials is not excluded. The charging of recycled oil to the reaction zone has already been mentioned. As described in greater detail below, still other materials fulfilling a variety of functions may also be charged. In such case, the carbo-metallic oil and catalyst usually represent the major proportion by weight of the total of all materials charged to the reaction zone.

Certain of the additional materials which may be used perform functions which offer significant advantages over the process as performed with only the carbo-metallic oil and catalyst. Among these functions are: controlling the effects of heavy metals and other catalyst contaminants; enhancing catalyst activity; absorbing excess heat in the catalyst as received from the regenerator; disposal of pollutants or conversion thereof to a form or forms in which they may be more readily separated from products and/or disposed of; controlling catalyst temperature; diluting the carbo-metallic oil vapors to reduce their partial pressure and increase the yield of desired products; adjusting feed/catalyst contact time; donation of hydrogen to a hydrogen deficient carbo-metallic oil feedstock for example as disclosed in copending application Ser. No. 246,791, entitled "Use of Naphtha in Carbo-Metallic Oil Conversion", filed in the name of George D. Myers on Mar. 23, 1981, which application is incorporated herein by reference; assisting in the dispersion of the feed; and possibly also distillation of products. Certain of the metals in the heavy metals accumulation on the catalyst are more active in promoting undesired reactions when they are in the form of elemental metal than they are when in the oxidized form produced by contact with oxygen in the catalyst regenerator. However, the time of contact between catalyst and vapors of feed and product in past conventional catalytic cracking was sufficient so that hydrogen released in the cracking reaction was able to reconvert a significant portion of the less harmful oxides back to the more harmful elemental heavy metals. One can take advantage of this situation through the introduction of additional materials which are in gaseous (including vaporous) form in the reaction zone in admixture with the catalyst and vapors of feed and products. The increased volume of material in the reaction zone resulting from the presence of such additional materials tend to increase the velocity of flow through the reaction zone with a corresponding decrease in the residence time of the catalyst and oxidized heavy metals borne thereby. Because of this reduced residence time, there is less opportunity for reduction of the oxidized heavy metals to elemental form and therefore less of the harmful elemental metals are available for contacting the feed and products.

Added materials may be introduced into the process in any suitable fashion, some examples of which follow. For instance, they may be admixed with the carbo-metallic oil feedstock prior to contact of the latter with the catalyst. Alternatively, the added materials may, if desired, be admixed with the catalyst prior to contact of the latter with the feedstock. Separate portions of the added materials may be separately admixed with both catalyst and carbo-metallic oil. Moreover, the feedstock, catalyst and additional materials may, if desired, be brought together substantially simultaneously. A portion of the added materials may be mixed with catalyst and/or carbo-metallic oil in any of the above-described ways, while additional portions are subsequently brought into admixture. For example, a portion of the added materials may be added to the carbo-metallic oil and/or to the catalyst before they reach the reaction zone, while another portion of the added materials is introduced directly into the reaction zone. The added materials may be introduced at a plurality of spaced locations in the reaction zone or along the length thereof, if elongated.

The amount of additional materials which may be present in the feed, catalyst or reaction zone for carrying out the above functions, and others, may be varied as desired; but said amount will preferably be sufficient to substantially heat balance the process. These materials may for example be introduced into the reaction zone in a weight ratio relative to feed of up to about 0.4, preferably in the range of about 0.02 to about 0.4, more preferably about 0.03 to about 0.3 and most preferably about 0.05 to about 0.25.

For example, many or all of the above desirable functions may be attained by introducing $H_2O$ to the reaction zone in the form of steam or of liquid water or a combination thereof in a weight ratio relative to feed in the range of about 0.04 or more, or more preferably about 0.05 to about 0.1 or more. Without wishing to be bound by any theory, it appears that the use of $H_2O$ tends to inhibit reduction of catalyst-borne oxides, sulfites and sulfides to the free metallic form which is believed to promote condensation-dehydrogenation with consequent promotion of coke and hydrogen yield and accompanying loss of product. Moreover, $H_2O$ may also, to some extent, reduce deposition of metals onto the catalyst surface. There may also be some tendency to desorb nitrogen-containing and other heavy contaminant-containing molecules from the surface of the catalyst particles, or at least some tendency to inhibit their absorption by the catalyst It is also believed that added $H_2O$ tends to increase the acidity of the catalyst by Bronsted acid formation which in turn enhances the activity of the catalyst. Assuming the $H_2O$ as supplied is cooler than the regenerated catalyst and/or the temperature of the reaction zone, the sensible heat involved in raising the temperature of the $H_2O$ upon contacting the catalyst in the reaction zone or elsewhere can absorb excess heat from the catalyst. Where the $H_2O$ is or includes recycled water that contains for example about 500 to about 5000 ppm of $H_2S$ dissolved therein, a number of additional advantages may accrue. The ecologically unattractive $H_2S$ need not be vented to the atmosphere, the recycled water does not require further treatment to remove $H_2S$ and the $H_2S$ may be of assistance in reducing coking of the catalyst by passivation of the heavy metals, i.e., by conversion thereof to the sulfide form which has a lesser tendency than the free metals to enhance coke and hydrogen production. In the reaction zone, the presence of $H_2O$ can dilute the carbo-metallic oil vapors, thus reducing their partial pressure and tending to increase the yield of the desired products. It has been reported that $H_2O$ is useful in combination with other materials in generating hydrogen during cracking; thus it may be able to act as a hydrogen donor for hydrogen deficient carbo-metallic oil feedstocks. The $H_2O$ may also serve certain purely mechanical functions such as: assisting in the atomizing or dispersion of the feed; competing with high molecular weight molecules for adsorption on the surface of the catalyst, thus interrupting coke formation; steam distillation of vaporizable product from unvaporized feed material; and disengagement of product from catalyst upon conclusion of the cracking reaction. It is particularly preferred to bring together $H_2O$, catalyst and carbo-metallic oil substantially simultaneously. For example, one may admix $H_2O$ and feedstock in an atomizing nozzle and immediately direct the resultant spray into contact with the catalyst at the downstream end of the reaction zone.

The addition of steam to the reaction zone is frequently mentioned in the literature of fluid catalytic cracking. Addition of liquid water to the feed is discussed relatively infrequently, compared to the introduction of steam directly into the reaction zone. However, in accordance with the present invention it is particularly preferred that liquid water be brought into intimate admixture with the carbo-metallic oil in a weight ratio of about 0.04 to about 0.25 at or prior to the time of introduction of the oil into the reaction zone, whereby the water (e.g., in the form of liquid water or in the form of steam produced by vaporization of liquid water in contact with the oil) enters the reaction zone as part of the flow of feedstock which enters such zone. Although not wishing to be bound by any theory, it is believed that the foregoing is advantageous in promoting dispersion of the feedstock. Also, the heat of vaporization of the water, which heat is absorbed from the catalyst, from the feedstock, or from both causes the water to be a more efficient heat sink than steam alone. Preferably the weight ratio of liquid water to feed is about 0.04 to about 0.2 more preferably about 0.05 to about 0.15.

Of course, the liquid water may be introduced into the process in the above-described manner or in other ways, and in either event the introduction of liquid water may be accompanied by the introduction of additional amounts of water as steam into the same or different portions of the reaction zone or into the catalyst and/or feedstock. For example, the amount of additional steam may be in a weight ratio relative to feed in the range of about 0.01 to about 0.25, with the weight ratio of tatal $H_2O$ (as steam and liquid water) to feedstock being about 0.3 or less. The charging weight ratio of liquid water relative to steam in such combined use of liquid water and steam may for example range from about 15 which is presently preferred, to about 0.2. Such ratio may be maintained at a predetermined level within such range or varied as necessary or desired to adjust or maintain heat balance.

Other materials may be added to the reaction zone to perform one or more of the above-described functions. For example, the dehydrogenation-condensation activity of heavy metals may be inhibited by introducing hydrogen sulfide gas into the reaction zone. Hydrogen may be made available for hydrogen deficient carbo-metallic oil feedstock by introducing into the reaction zone either a conventional hydrogen donor diluent such as a heavy naphtha or relatively low molecular weight carbon-hydrocarbon fragment contributors, including for example: light paraffins; low molecular weight alcohols and other compounds which permit or favor intermolecular hydrogen transfer; and compounds that chemically combine to generate hydrogen in the reaction zone such as by reaction of carbon monoxide with water, or with alcohols, or with olefins, or with other materials or mixtures of the foregoing.

All of the above-mentioned additional materials (including water), along or in conjunction with each other or in conjunction with other materials, such as nitrogen or other inert gases, light hydrocarbons, and others, may perform any of the above-described functions for which they are suitable, including without limitation, acting as diluents to reduce feed partial pressure and/or as heat sinks to absorb excess heat present in the catalyst as received from the regeneration step. The foregoing is a discussion of some of the functions which can be performed by materials other than catalyst and carbo-metallic oil feedstock introduced into the reaction zone, and it should be understood that other materials may be added or other functions performed without departing from the spirit of the invention.

The invention may be practiced in a wide variety of apparatus. However, the preferred apparatus includes means for rapidly vaporizing as much feed as possible and efficiently admixing feed and catalyst (although not necessarily in that order), for causing the resultant mixture to flow as a dilute suspension in a progressive flow mode, and for separating the catalyst from cracked products and any uncracked or only partially cracked feed at the end of a predetermined residence time or times, it being preferred that all or at least a substantial portion of the product should be abruptly separated from at least a portion of the catalyst.

For example, the apparatus may include, along its elongated reaction chamber, one or more points for introduction of carbo-metallic feed, one or more points for introduction of catalyst, one or more points for introduction of additional material, one or more points for withdrawal of products and one or more points for withdrawal of catalyst. The means for introducing feed, catalyst and other material may range from open pipes to sophisticated jets or spray nozzles, it being preferred to use means capable of breaking up the liquid feed into fine droplets. Preferably, the catalyst, liquid water (when used) and fresh feed are brought together in an apparatus similar to that disclosed in U.S. patent application Ser. No. 969,601 of George D. Myers, et al, filed Dec. 14, 1978 for "Method for Cracking Residual Oils" the entire disclosure of which is hereby incorporated herein by reference. A particularly preferred embodiment for introducing liquid water and oil into the riser is described in co-pending patent application Ser. No. 295,335 filed Aug. 24, 1981 in the name of Stephen M. Kovach et al for "Homogenation of Water and Reduced Crude", and the entire disclosure of said U.S. application is incorporated herein by reference. As described in that application the liquid water and carbo-metallic oil, prior to their introduction into the riser, are caused to pass through a propeller, apertured disc, or any appropriate high shear agitating means for forming a "homogenized mixture" containing finely divided droplets of oil and/or water with oil and/or water present as a continuous phase.

REACTOR

It is preferred that the reaction chamber, or at least the major portion thereof, be more nearly vertical than horizontal and have a length to diameter ratio of at least about 10, more preferably about 20 or 25 or more. Use of a vertical riser type reactor is preferred. If tubular, the reactor can be of uniform diameter throughout or may be provided with a continuous or step-wise increase in diameter along the reaction path to maintain or vary the velocity along the flow path.

In general, the charging means (for catalyst and feed) and the reactor configuration are such as to provide a relatively high velocity of flow and dilute suspension of catalyst. For example, the vapor or catalyst velocity in the riser will be usually at least about 25 and more typically at least about 35 feet per second. This velocity may range up to about 55 or about 75 feet or about 100 feet per second or higher. The vapor velocity at the top of the reactor may be higher than that at the bottom and may for example be about 80 feet per second at the top and about 40 feet per second at the bottom. The velocity capabilities of the reactor will in general be sufficient to prevent substantial build-up of catalyst bed in the bottom or other portions of the riser, whereby the catalyst loading in the riser can be maintained below 4 or 5 pounds, as for example about 0.5 pounds, and below about 2 pounds, as for example 0.8 pounds, per cubic foot, respectively, at the upstream (e.g., bottom) and downstream (e.g., top) ends of the riser The progressive flow mode involves, for example, flowing of catalyst, feed and products as a stream in a positively controlled and maintained direction established by the elongated nature of the reaction zone This is not to suggest however that there must be strictly linear flow. As is well known, turbulent flow and "slippage" of catalyst may occur to some extent especially in certain ranges of vapor velocity and some catalyst loadings, although it has been reported advisable to employ sufficiently low catalyst loadings to restrict slippage and back-mixing.

Most preferably the reactor is one which abruptly separates a substantial portion or all of the vaporized cracked products from the catalyst at one or more points along the riser, and preferably separates substantially all of the vaporized cracked products from the catalyst at the downstream end of the riser A preferred type of reactor embodies ballistic separation of the catalyst and products; that is, catalyst is projected in a direction established by the riser tube, and is caused to continue in motion in the general direction so established, while the products, having lesser momentum, are caused to make an abrupt change of direction, resulting in an abrupt, substantially instantaneous separation of product from catalyst. In a preferred embodiment referred to as a vented riser, the riser tube is provided with a substantially unobstructed discharge opening at its downstream end for discharge of catalyst. An exit port near the tube outlet adjacent the downstream end receives the products. The discharge opening communicates with a catalyst flow path which extends to the usual stripper and regenerator, while the exit port communicates with a catalyst flow path which extends to the usual stripper and regenerator, while the exit port communicates with a product flow path which is substantially or entirely separated from the catalyst flow path and leads to separation means for separating the products from the relatively small portion of catalyst, if any, which manages to gain entry to the product exit port.

A particularly preferred embodiment for separating catalyst and product is described in U.S. patent application Ser. No. 263,394 filed May 13, 1981 in the names of Dwight Barger et al., for "Carbo-Metallic Oil Conversion With Ballistic Separation" and the entire disclosure of that application is hereby incorporated by reference. The ballistic separation step disclosed therein includes diversion of the product vapors upon discharge from the riser tube; that is, the product vapors make a turn or change of direction of about 45°, 90°, 105° or more at the riser tube outlet. This may be accomplished for example by providing an annular cuplike member surrounding the riser tube at its upper end. The ratio of cross-sectional area of the annulus of the cup-like member relative to the cross-section area of the riser outlet is preferably low i.e., less than 1 and preferably less than about 0.6. Preferably the lip of the cup is slightly upstream of, or below the downstream end of top of the riser tube, and the cup is preferably concentric with the riser tube. By means of a product vapor line communicating with the interior of the cup but not the interior of the riser tube, having its inlet positioned within the cup interior in a direction upstream of the riser tube outlet, product vapors emanating from the riser tube and entering the cup by diversion of direction are transported away from the cup to auxiliary catalyst and product separation equipment downstream of the cup. Such an arrangement can produce a high degree of completion of the separation of catalyst from product vapors at the vented riser tube outlet, so that the required amount of auxiliary catalyst separation equipment such as cyclones is greatly reduced, with consequent large savings in capital investment and operating cost.

Preferred conditions for operation of the process are described below. Among these are feed, catalyst and reaction temperatures, reaction and feed pressures, residence time and levels of conversion, coke production and coke laydown on catalyst.

In conventional FCC operations with VGO, the feedstock is customarily preheated, often to temperatures significantly higher than are required to make the feed sufficiently fluid for pumping and for introduction into the reactor. For example, preheat temperatures as high as about 700° or 800° F. have been reported. But in our process as presently practiced it is preferred to restrict preheating of the feed, so that the feed is capable of absorbing a larger amount of heat from the catalyst while the catalyst raises the feed to conversion temperature, at the same time minimizing utilization of external fuels to heat the feedstock.

Thus, where the nature of the feedstock permits, it may be fed at ambient temperature. Heavier stocks may be fed at preheat temperatures of up to about 500° F., typically about 200° F. to about 500° F., but higher preheat temperatures are not necessarily excluded.

The catalyst fed to the reactor may vary widely in temperature, for example from about 1100° to about 1600° F., more preferably about 1200° to about 1500° F. and most preferably about 1200° to about 1500° F. and most preferably about 1300° to about 1400° F., with about 1325° to about 1375° F. being considered optimum at present.

As indicated previously, the conversion of the carbometallic oil to lower molecular weight products may be conducted at a temperature of about 900° to about 1400° F., measured at the reaction chamber outlet. The reaction temperature as measured at said outlet is more preferably maintained in the range of about 965° to about 1300° F., still more preferably about 975° to about 1150° F. Depending upon the temperature selected and the properties of the feed, all of the feed may or may not vaporize in the riser.

Although the pressure in the reactor may, as indicated above, range from about 10 to about 50 psia, preferred and more preferred pressure ranges are about 15 to about 35 and about 20 to about 35. In general, the partial (or total) pressure of the feed may be in the range of about 3 to about 30, more preferably about 7 to about 25 and most preferably about 10 to about 17 psia. The feed partial pressure may be controlled or suppressed by the introduction of gaseous (including vaporous) materials into the reactor, such as for instance the steam, water and other additional materials described above. The process has for example been operated with the ratio of feed partial pressure relative to total pressure in the riser in the range of about 0.2 to about 0.8, more typically about 0.3 to about 0.7 and still more typically about 0.4 to about 0.6, with the ratio of added gaseous material (which may include recycled gases and/or steam resulting from introduction of $H_2O$ to the riser in the form of steam and/or liquid water) relative to total pressure in the riser correspondingly ranging from about 0.8 to about 0.2, more typically about 0.7 to about 0.3 and still more typically about 0.6 to about 0.4. In the illustrative operations just described, the ratio of the partial pressure of the added gaseous material relative to the partial pressure of the feed has been in the range of about 0.25 to about 4.0, more typically about 0.4 to about 2.3 and still more typically about 0.7 to about 1.7. Although the residence time of feed and product vapors in the riser may be in the range of about 0.5 to about 10 seconds, as described above, preferred and more preferred values are about 0.5 to about 6 and about 1 to about 4 seconds, with about 1.5 to about 3.0 seconds currently being considered optimum, For example, the process has been operated with a riser vapor residence time of about 2.5 seconds or less by introduction of copious amounts of gaseous materials into the riser, such amounts being sufficient to provide for example a partial pressure ratio of added gaseous materials relative to hydrocarbon feed of about 0.8 or more. By way of further illustration, the process has been operated with said residence time being about 2 seconds or less, with the aforesaid ratio being in the range of about 1 to about 2. The combination of low feed partial pressure, very low residence time and ballistic separation of products from catalyst are considered especially beneficial for the conversion of carbo-metallic oils. Additional benefits may be obtained in the foregoing combination when there is a substantial partial pressure of added gaseous material, especially $H_2O$ as described above.

Depending upon whether there is slippage between the catalyst and hydrocarbon vapors in the riser, the catalyst riser residence time may or may not be the same as that of the vapors. U.S. patent application Ser. No. 263,398 filed May 13, 1981 in the names of Stephen M. Kovach et al., for "Process for Cracking High Boiling Hydrocarbons Using High Ratio of Catalyst Residence Time to Vapor Residence Time" discloses a cracking process employing a high slippage ratio, and the disclosure of that application is hereby incorporated by reference. As disclosed therein, the ratio of average catalyst reactor residence time versus vapor reactor residence time, i.e., slippage, may be in the range from about 1.2:1 to about 12:1, more preferably from about 1.5:1 to about 5:1 and most preferably from about 1.8:1 to about 3:1, with about 1 to about 2 currently being considered optimum.

In practice, there will usually be a small amount of slippage, e.g., at least about 1.05 or 1.2. In an operating unit there may for example be a slippage of about 1.1 at the bottom of the riser and about 1.5 at the top.

In certain types of known FCC units, there is a riser which discharges catalyst and product vapors together into an enlarged chamber, usually considered to be part of the reactor, in which the catalyst is disengaged from product and collected. Continued contact of catalyst, uncracked feed (if any) and cracked products in such enlarged chamber results in an overall catalyst feed contact time appreciably exceeding the riser tube residence times of the vapors and catalysts. When practicing the process of the present invention with ballistic separation of catalyst and vapors at the downstream (e.g., upper) extremity of the riser, such as is taught in the above-mentioned Myers, et al., patents, the riser residence time and the catalyst contact time are substantially the same for a major portion of the feed and product vapors. It is considered advantageous if the vapor riser residence time and vapor catalyst contact time are substantially the same for at least about 80%, more preferably at least about 90% and most preferably at least about 95% by volume of the total feed and product vapors passing through the riser. By denying such vapors continued contact with catalyst in a catalyst disengagement and collection chamber one may avoid a tendency toward re-cracking and diminished selectivity.

In general, the combination of catalyst-to-oil ratio, temperatures, pressures and residence times should be such as to effect a substantial conversion of the carbo-metallic oil feedstock. It is an advantage of the process that very high levels of conversion can be attained in a single pass; for example the conversion may be in excess of 50% and may range to about 90% or higher. Preferably, the aforementioned conditions are maintained at levels sufficient to maintain conversion levels in the range of about 60 to about 90% and more preferably about 70 to about 85%. The foregoing conversion levels are calculated by subtracting from 100% the percentage obtained by dividing the liquid volume of fresh feed into 100 times the volume of liquid product boiling at and above 430° (tbp, standard atmospheric pressure).

These substantial levels of conversion may and usually do result in relatively large yields of coke, such as for example about 4 to about 14% by weight based on fresh feed, more commonly about 6 to about 13% and most frequently about 10 to about 13%. The coke yield can more or less quantitatively deposit upon the catalyst. At contemplated catalyst to oil ratios, the resultant coke laydown may be in excess of about 0.3, more commonly in excess of about 0.5 and very frequently in excess of about 1% of coke by weight, based on the weight of moisture free regenerated catalyst. Such coke laydown may range as high as about 2%, or about 3%, or even higher.

The spent catalyst, disengaged from product vapors, is passed into the lower portion of an elongated stripping vessel, preferably of the vented riser type, where it is mixed with hot regenerated catalyst and a lifting gas. The lifting gas not only lifts the mixture of catalysts through the elongated stripping vessel, but also helps transfer heat from the hot regenerated catalyst to the spent catalyst. The lifting gas can, if sufficiently hot, provide additional heat to the spent catalyst. The temperature of the spent catalyst is thus raised and at least a portion of the high boiling hydrocarbons are vaporized. The vaporized hydrocarbons, being highly mobile, are able to contact the active regenerated catalyst and thus be cracked into lighter products.

The lifting gas and gaseous products are separated from the mixture of catalysts at the top of the elongated stripping chamber. These gases are preferably mixed with product gases from the riser reactor for further processing.

The resulting mixture of catalysts may then be sent to a regenerator. However, in the preferred method of carrying out this invention, the mixture of catalysts is further stripped in a second stripping zone using more conventional stripping agents such as steam, flue gas or nitrogen. Persons skilled in the art are acquainted with stripping agents and conditions for stripping spent catalysts. For example, the stripper may be operated at a temperature of about 350° F. using steam and a pressure of about 150 psig and a weight ratio of steam to catalyst of about 0.002 to about 0.003. On the other hand, the stripper may be operated at a temperature of about 1025° F. or higher.

REGENERATION OF SPENT CATALYST

Substantial conversion of carbo-metallic oils to lighter products in accordance with the invention tends to produce sufficiently large coke yields and coke laydown on catalyst to require some care in catalyst regeneration. In order to maintain adequate activity in zeolite and non-zeolite catalysts, it is desirable to regenerate the catalyst under conditions of time, temperature and atmosphere sufficient to reduce the percent by weight of carbon remaining on the catalyst to about 0.25% or less, whether the catalyst bears a large heavy metals accumulation or not.

Preferably this weight percentage is about 0.1% or less and more preferably about 0.05% or less, especially with zeolite catalysts. The amounts of coke which must therefore be burned off of the catalysts when processing carbo-metallic oils are usually substantially greater than would be the case when cracking VGO. The term coke when used to describe the present invention, should be understood to include any residual unvaporized feed or cracking product, if any such material is present on the catalyst after stripping.

Regeneration of catalyst, burning away of coke deposited on the catalyst during the conversion of the feed, may be performed at any suitable temperature in the range of about 1100° to about 1600° F., measured at the regenerator catalyst outlet. This temperature is preferably in the range of about 1200° to about 1500° F., more preferably about 1275° to about 1425° F. and optimally about 1325° F. to about 1375° F. The process has been operated, for example with a fluidized regenerator with the temperature of the catalyst dense phase in the range of about 1300° to about 1400° F.

Regeneration is preferably conducted while maintaining the catalyst in one or more fluidized beds in one or more fluidization chambers. Such fluidized bed operations are characterized, for instance, by one or more fluidized dense beds of ebulliating particles having a bed density of, for example, about 25 to about 50 pounds per cubic foot. Fluidization is maintained by passing gases, including combustion supporting gases, through the bed at a sufficient velocity to maintain the particles in a fluidized state but at a velocity which is sufficiently small to prevent substantial entrainment of particles in the gases. For example, the lineal velocity of the fluidizing gases may be in the range of about 0.2 to about 4 feet per second and preferably about 0.2 to about 3 feet per second. The average total residence time of the particles in the one or more beds is substantial, ranging for example from about 5 to about 30, more preferably about 5 to about 20 and still more preferably about 5 to about 10 minutes. From the foregoing, it may be readily seen that the fluidized bed regeneration of the present invention is readily distinguishable from the short-contact, low-density entrainment type regeneration which has been practiced in some FCC operations.

When regenerating catalyst to very low levels of carbon on regenerated catalyst, e.g., about 0.1% or less or about 0.05% or less, based on the weight of regenerated catalyst, it is acceptable to burn off at least about the last 10% or at least about the last 5% by weight of coke (based on the total weight of coke on the catalyst immediately prior to regeneration) in contact with combustion producing gases containing excess oxygen. In this connection it is contemplated that some selected portion of the coke, ranging from all of the coke down to about the last 5 or 10% by weight, can be burned with excess oxygen. By excess oxygen is meant an amount in excess of the stoichiometric requirement for burning all of the hydrogen to water, all of the carbon to carbon dioxide and all of the other combustible components, if any, which are present in the above-mentioned selected portion of the coke immediately prior to regeneration, to their highest stable state of oxidation under the regenerator conditions. The gaseous products of combustion conducted in the presence of excess oxygen will normally include an appreciable amount of free oxygen. Such free oxygen, unless removed from the by-product gases or converted to some other form by a means or process other than regeneration, will normally manifest itself as free oxygen in the flue gas from the regenerator unit. In order to provide sufficient driving force to complete the combustion of the coke with excess oxygen, the amount of free oxygen will normally be not merely appreciable but substantial, i.e., there will be a concentration of at least about 2 mole percent of free oxygen in the total regeneration flue gas recovered from the entire, completed regeneration operation. While such technique is effective in attaining the desired low levels of carbon on regenerated catalyst, it has its limitations and difficulties as will become apparent from the discussion below.

Heat released by combustion of coke in the regenerator is absorbed by the catalyst and can be readily retained thereby until the regenerated catalyst is brought into contact with fresh feed. When processing carbo-metallic oils to the relatively high levels of conversion involved in the present invention, the amount of regenerator heat which is transmitted to fresh feed by way of recycling regenerated catalyst can substantially exceed the level of heat input which is appropriate in the riser for heating and vaporizing the feed and other materials, for supplying endothermic heat of reaction for cracking, for making up the heat losses of the unit and so forth. Thus, in accordance with the invention, the amount of regenerator heat transmitted to fresh feed may be controlled, or restricted where necessary, within certain approximate ranges. The amount of heat so transmitted may for example be in the range of about 500 to about 1200, more particularly about 600 to about 900, and more particularly about 650 to about 850 BTU's per pound of fresh feed. The aforesaid ranges refer to the combined heat, in BTUs per pound of fresh feed, which is transmitted by the catalyst to the feed and reaction products (between the contacting of feed with the catalyst and the separation of product from catalyst) for supplying the heat of reaction (e.g., for cracking)

and the difference in enthalpy between the products and the fresh feed. Not included in the foregoing are the heat made available in the reactor by the adsorption of coke on the catalyst, nor the heat consumed by heating, vaporizing or reacting recycle streams and such added materials as water, steam, naphtha and other hydrogen donors, flue gases and inert gases, or by radiation and other losses.

One or a combination of techniques may be utilized in this invention for controlling or restricting the amount of regeneration heat transmitted via catalyst to fresh feed. For example, one may add a combustion modifier to the cracking catalyst in order to reduce the temperature of combustion of coke to carbon dioxide and/or carbon monoxide in the regenerator. Moreover, one may remove heat from the catalyst through heat exchange means, including for example, heat exchangers (e.g., steam coils) built into the regenerator itself, whereby one may extract heat from the catalyst during regeneration. Heat exchangers can be built into catalyst transfer lines, such as for instance the catalyst return line from the regenerator to the reactor, whereby heat may be removed from the catalyst after it is regenerated. The amount of heat imparted to the catalyst in the regenerator may be restricted by reducing the amount of insulation on the regenerator to permit some heat loss to the surrounding atmosphere, especially if feeds of exceedingly high coking potential are planned for processing; in general, such loss of heat to the atmosphere is considered economically less desirable than certain of the other alternatives set forth herein. One may also inject cooling fluids into portions of the regenerator other than those occupied by the dense bed, for example water and/or steam, whereby the amount of inert gas available in the regenerator for heat absorption and removal is increased. U.S. patent application Ser. No. 251,032 filed Apr. 3, 1981 in the names of George D. Myers et al., for "Addition of Water to Regeneration Air" describes one method of heat control by adding water to a regenerator, and the entire disclosure of said application is hereby incorporated by reference.

Another suitable and preferred technique for controlling or restricting the heat transmitted to fresh feed via recycled regenerated catalyst involves maintaining a specified ratio between the carbon dioxide and carbon monoxide formed in the regenerator while such gases are in heat exchange contact or relationship with catalyst undergoing regeneration. In general, all or a major portion by weight of the coke present on the catalyst immediately prior to regeneration is removed in at least one combustion zone in which the aforesaid ratio is controlled as described below. More particularly, at least the major portion more preferably at least about 65% and more preferably at least about 80% by weight of the coke on the catalyst is removed in a combustion zone in which the molar ratio of $CO_2$ to $CO$ is maintained at a level substantially below 5, e.g., about 4 or less. Looking at the $CO_2/CO$ relationship from the inverse standpoint, it is preferred that the $CO/CO_2$ molar ratio should be at least about 0.25 and preferably at least about 0.3 and still more prefer ably about 1 or more or even 1.5 or more.

U.S. patent application Ser. No. 246,751 for "Addition of $MgCl_2$ to Catalyst" and Ser. No. 246,782 for "Addition of Chlorine to Regenerator" bothfiled in the name of George D. Myers on Mar. 23, 1981 describe methods for ihibiting the oxidation of $CO$ to $CO_2$, thus increasing the $CO/CO_2$ ratio, and disclosures of each of these patent applications is hereby incorporated by reference.

U.S. patent application Ser. No. 290,277 filed Aug. 5, 1981 in the name of William P. Hettinger, Jr., et al, for "Endothermic Removal of Coke Deposited on Catalytic Material During Carbo-Metallic Oil Conversion" describes catalysts containing additives which catalyze the reaction between $CO_2$ and carbon to form $CO$, thus reducing the heat produced in the regenerator.

While persons skilled in the art are aware of techniques for inhibiting the burning of $CO$ to $CO_2$, it has been suggested that the mole ratio of $CO:CO_2$ should be kept less than 0.2 when regenerating catalyst with large heavy metal accumulations resulting from the processing of carbo-metallic oils. In this connection see for example U.S. Pat. No. 4,162,213 to Zrinscak, Sr., et al. In this invention, however, $CO$ production is increased while catalyst is regenerated to about 0.1% carbon or less, and preferably to about 0.05% carbon or less. Moreover, according to a preferred method of carrying out the invention the sub-process of regeneration, as a whole, may be carried out to the above-mentioned low levels of carbon on regenerated catalyst with a deficiency of oxygen; more specifically, the total oxygen supplied to the one or more stages of regeneration can be and preferably is less than the stoichiometric amount which would be required to burn all hydrogen in the coke to $H_2O$ and to burn all carbon in the coke to $CO_2$. If the coke includes other combustibles, the aforementioned stoichiometric amount can be adjusted to include the amount of oxygen required to burn them.

Still another particularly preferred technique for controlling or restricting the regeneration heat imparted to fresh feed via recycled catalyst involves the diversion of a portion of the heat borne by recycled catalyst to added materials introduced into the reactor, such as the water, steam, naphtha, other hydrogen donors, flue gases, inert gases, and other gaseous or vaporizable materials which may be introduced into the reactor.

The larger the amount of coke which must be burned from a given weight of catalyst, the greater the potential for exposing the catalyst to excessive temperatures. Many otherwise desirable and useful cracking catalysts are particularly susceptible to deactivation at high temperatures, and among these are quite a few of the costly molecular sieve or zeolite types of catalyst. The crystal structures of zeolites and the pore structures of the catalyst carriers generally are somewhat susceptible to thermal and/or hydrothermal degradation. The use of such catalysts in catalytic conversion processes for carbo-metallic feeds creates a need for regeneration techniques which will not destroy the catalyst by exposure to highly severe temperatures and steaming. Such need can be met by a multi-stage regeneration process which includes conveying spent catalyst into a first regeneration zone and introducing oxidizing gas thereto. The amount of oxidizing gas that enters said first zone and the concentration of oxygen or oxygen bearing gas therein are sufficient for only partially effecting the desired conversion of coke on the catalyst to carbon oxide gases. The partially regenerated catalyst is then removed from the first regeneration zone and is conveyed to a second regeneration zone. Oxidizing gas is introduced into the second regeneration zone to provide a higher concentration of oxygen or oxygen-containing gas than in the first zone, to complete the removal of carbon to the desired level. The regenerated catalyst may then be removed from the second zone and recycled to the reactor for contact with fresh feed. An example of such multi-stage regeneration process is described in U.S. patent application Ser. No. 969,602 of George D. Myers, et al., filed Dec. 14, 1978, the entire disclosure of which is hereby incorporated herein by reference. Another example may be found in U.S. Pat. No. 2,938,739.

Multi-stage regeneration offers the possibility of combining oxygen deficient regeneration with the control of the $CO:CO_2$ molar ratio. Thus, about 50% or more, more preferably about 65% to about 95%, and more preferably about 80% to about 95% by weight of the coke on the catalyst immediately prior to regeneration may be removed in one or more stages of regeneration in which the molar ratio of $CO:CO_2$ is controlled in the manner described above. In combination with the foregoing, the last 5% or more, or 10% or more by weight of the coke originally present, up to the entire amount of coke remaining after the preceding stage or stages, can be removed in a subsequent stage of regeneration in which more oxygen is present. Such process is susceptible of operation in such a manner that the total flue gas recovered from the entire, completed regeneration operation contains little or no excess oxygen, i.e., on the order of about 0.2 mole percent or less, or as low as about 0.1 mole percent or less, which is substantially less than the mole percent which has been suggested elsewhere. Thus, multi-stage regeneration is particularly beneficial in that it provides another convenient technique for restricting regeneration heat transmitted to fresh feed via regenerated catalyst and/or reducing the potential for thermal deactivation, while simultaneously affording an opportunity to reduce the carbon level on regenerated catalyst to those very low percentages (e.g., about 0.1% or less) which particularly enhance catalyst activity. For example, a two-stage regeneration process may be carried out with the first stage burning about 80% of the coke at a bed temperature of about 1300° F. to produce CO and $CO_2$ in a molar ratio of $CO/CO_2$ of about 1 and the second stage burning about 20% of the coke at a bed temperature of about 1350° F. to produce substantially all $CO_2$ mixed with free oxygen. Use of the gases from the second stage as combustion supporting gases for the first stage, along with additional air introduced into the first stage bed, results in an overall CO to $CO_2$ ratio of about 0.6, with a catalyst residence time of about 5 to 15 minutes total in the two zones. Moreover, where the regeneration conditions, e.g., temperature or atmosphere, are substantially less severe in the second zone than in the first zone (e.g., by at least about 10 and preferably at least about 20° F.), that part of the regeneration sequence which involves the most severe conditions is performed while there is still an appreciable amount of coke on the catalyst. Such operation may provide some protection of the catalyst from the more severe conditions. A particularly preferred embodiment of the invention is two-stage fluidized regeneration at a maximum temperature of about 1400° F. with a reduced temperature of at least about 10° or 20° F. in the dense phase of the second stage as compared to the dense phase of the first stage, and with reduction of carbon on catalyst to about 0.05% or less or even about 0.025% or less by weight in the second zone. In fact, catalyst can readily be regenerated to carbon levels as low as 0.01% by this technique, even though the carbon on catalyst prior to regeneration is as much as about 1%.

STRIPPING REGENERATED CATALYST

In most circumstances, it will be important to insure that no adsorbed oxygen containing gases are carried into the riser by recycled catalyst. Thus, whenever such action is considered necessary, the catalyst discharged from the regenerator may be stripped with appropriate stripping gases to remove oxygen-containing gases. Such stripping may for instance be conducted at relatively high temperatures, for example about 1350° to about 1370° F., using steam, nitrogen or other inert gas as the stripping gas(es). The use of nitrogen and other inert gases is beneficial from the standpoint of avoiding a tendency toward hydrothermal catalyst deactivation which may result from the use of steam.

PROCESS MANAGEMENT

The following comments and discussion relating to metals management, carbon management and heat management may be of assistance in obtaining best results when operating the invention. Since these remarks are for the most part directed to what is considered the best mode of operation, it should be apparent that the invention is not limited to the particular modes of operation discussed below. Moreover, since certain of these comments are necessarily based on theoretical considerations, there is no intention to be bound by any such theory, whether expressed herein or implicit in the operating suggestions set forth hereinafter.

Although discussed separately below, it is readily apparent that metals management, carbon management and heat management are interrelated and interdependent subjects both in theory and practice. While coke yield and coke laydown on catalyst are primarily the result of the relatively large quantities of coke precursors found in carbo-metallic oils, the production of coke is exacerbated by high metals accumulations, which can also significantly affect catalyst performance. Moreover, the degree of success experienced in metal management and carbon management will have a direct influence on the extent to which heat management is necessary. Moreover, some of the steps taken in support of metals management have proved very helpful in respect to carbon and heat management.

As noted previously the presence of a large heavy metals accumulation on the catalyst tends to aggravate the problem of dehydrogenation and aromatic condensation, resulting in increased production of gases and coke for a feedstock of a given Ramsbottom carbon value. The introduction of substantial quantities of $H_2O$ into the reactor, either in the form of steam or liquid water, appears highly beneficial from the standpoint of keeping the heavy metals in a less harmful form, i.e., the oxide rather than metallic form. This is of assistance in maintaining the desired selectivity.

Also, a unit design in which system components and residence times are selected to reduce the ratio of catalyst reactor residence time relative to catalyst regenerator residence time will tend to reduce the ratio of the times during which the catalyst is respectively under reduction conditions and oxidation conditions. This too can assist in maintaining desired levels of selectivity.

Whether the metals content of the catalyst is being managed successfully may be observed by monitoring the total hydrogen plus methane produced in the reactor and/or the ratio of hydrogen to methane thus produced. In general, it is considered that the hydrogen to methane mole ratio should be less than about 1 and preferably about 0.6 or less, with about 0.4 or less being considered about optimum. In actual practice the hydrogen to methane ratio may range from about 0.5 to about 1.5 and average about 0.8 to about 1.

Careful carbon management can improve both selectivity (the ability to maximize production of valuable products), and heat productivity. In general, the techniques of metals control described above are also of assistance in carbon management. The usefulness of water addition in respect to carbon management has already been spelled out in considerable detail in that part of the specification which relates to added materials for introduction into the reaction zone. In general, those techniques which improve dispersion of the feed in the reaction done should also prove helpful. These include for instance the use of fogging or misting devices to assist in dispersing the feed.

Catalyst-to-oil ratio is also a factor in heat management. In common with prior FCC practice on VGO, the reactor temperature may be controlled in the practice of the present invention by respectively increasing or decreasing the flow of hot regenerated catalyst to the reactor in response to decreases and increases in reactor temperature, typically the outlet temperature in the case of a riser type reactor. Where the automatic controller for catalyst introduction is set to maintain an excessive catalyst to oil ratio, one can expect unnecessarily large rates of carbon production and heat release, relative to the weight of fresh feed charged to the reaction zone.

Relatively high reactor temperatures are also beneficial from the standpoint of carbon management. Such higher temperatures foster more complete vaporization of feed and disengagement of product from catalyst.

Carbon management can also be facilitated by suitable restriction of the total pressure in the reactor and the partial pressure of the feed. In general, at a given level of conversion, relatively small decreases in the aforementioned pressures can substantially reduce coke production. This may be due to the fact that restricting total pressure tends to enhance vaporization of high boiling components of the feed, encourage cracking and facilitate disengagement of both unconverted feed and higher boiling cracked products from the catalyst. It may be of assistance in this regard to restrict the pressure drop of equipment downstream of and in communication with the reactor. But if it is desired or necessary to operate the system at higher total pressure, such as for instance because of operating limitations (e.g., pressure drop in downstream equipment) the above-described benefits may be obtained by restricting the feed partial pressure Suitable ranges for total reactor pressure and feed partial pressure have been set forth above, and in general it is desirable to attempt to minimize the pressure within these ranges.

The abrupt separation of catalyst from product vapors and unconverted feed (if any) is also of great assistance. For this reason ballistic separation equipment is the preferred type of apparatus for conducting this process. For similar reasons, it is beneficial to reduce insofar as possible the elapsed time between separation of catalyst from product vapors and the commencement of stripping. The cup-type vented riser and prompt stripping tend to reduce the opportunity for coking of unconverted feed and higher boiling cracked products adsorbed on the catalyst.

A particularly desirable mode of operation from the standpoint of carbon management is to operate the process in the vented riser using a hydrogen donor if necessary, while maintaining the feed partial pressure and total reactor pressure as low as possible, and incorporating relatively large amounts of water, steam and if desired, other diluents, which provide the numerous benefits discussed in greater detail above. Moreover, when liquid water, steam, hydrogen donors, hydrogen and other gaseous or vaporizable materials are fed to the reaction zone, the feeding of these materials provides an opportunity for exercising additional control over catalyst-to-oil ratio. Thus, for example, the practice of increasing or decreasing the catalyst-to-oil ratio for a given amount of decrease or increase in reactor temperature may be reduced or eliminated by substituting either appropriate reduction or increase in the charging ratios of the water, steam and other gaseous or vaporizable material, or an appropriate reduction or increase in the ratio of water to steam and/or other gaseous materials introduced into the reaction zone.

Heat management includes measures taken to control the amount of heat released in various parts of the process and/or for dealing successfully with such heat as may be released. Unlike conventional FCC practice using VGO, wherein it is usually a problem to generate sufficient heat during regeneration to heat balance the reactor, the processing of carbo-metallic oils generally produces so much heat as to require careful management thereof.

Heat management can be facilitated by various techniques associated with the materials introduced into the reactor. Thus, heat absorption by feed can be maximized by minimum preheating of feed, it being necessary only that the feed temperature be high enough so that it is sufficiently fluid for successful pumping and dispersion in the reactor. When the catalyst is maintained in a highly active state with the suppression of coking (metals control), so as to achieve higher conversion, the resultant higher conversion and greater selectivity can increase the heat absorption of the reaction. In general, higher reactor temperatures promote catalyst conversion activity in the face of more refractory and higher boiling constituents with high coking potentials. While the rate of catalyst deactivation may thus be increased, the higher temperature of operation tends to offset this loss in activity. Higher temperatures in the reactor also contribute to enhancement of octane number, thus offsetting the octane depressant effect of high carbon laydown. Other techniques for absorbing heat have also been discussed above in connection with the introduction of water, steam, and other gaseous or vaporizable materials into the reactor.

The invention may also be applied to the RCC conversion of crude oils and crude oil fractions as disclosed in the U.S. patent application Ser. No. 263,397 of Dwight F. Barger, entitled "Single Unit RCC" and filed on May 13, 1981 the entire contents of which are hereby incorporated by reference.

As noted above, the invention can be practiced in the above-described mode and in many others. An illustrative, nonlimiting example is described by the accompanying schematic diagrams in the figure and by the description of this figure which follows.

Figure 2:
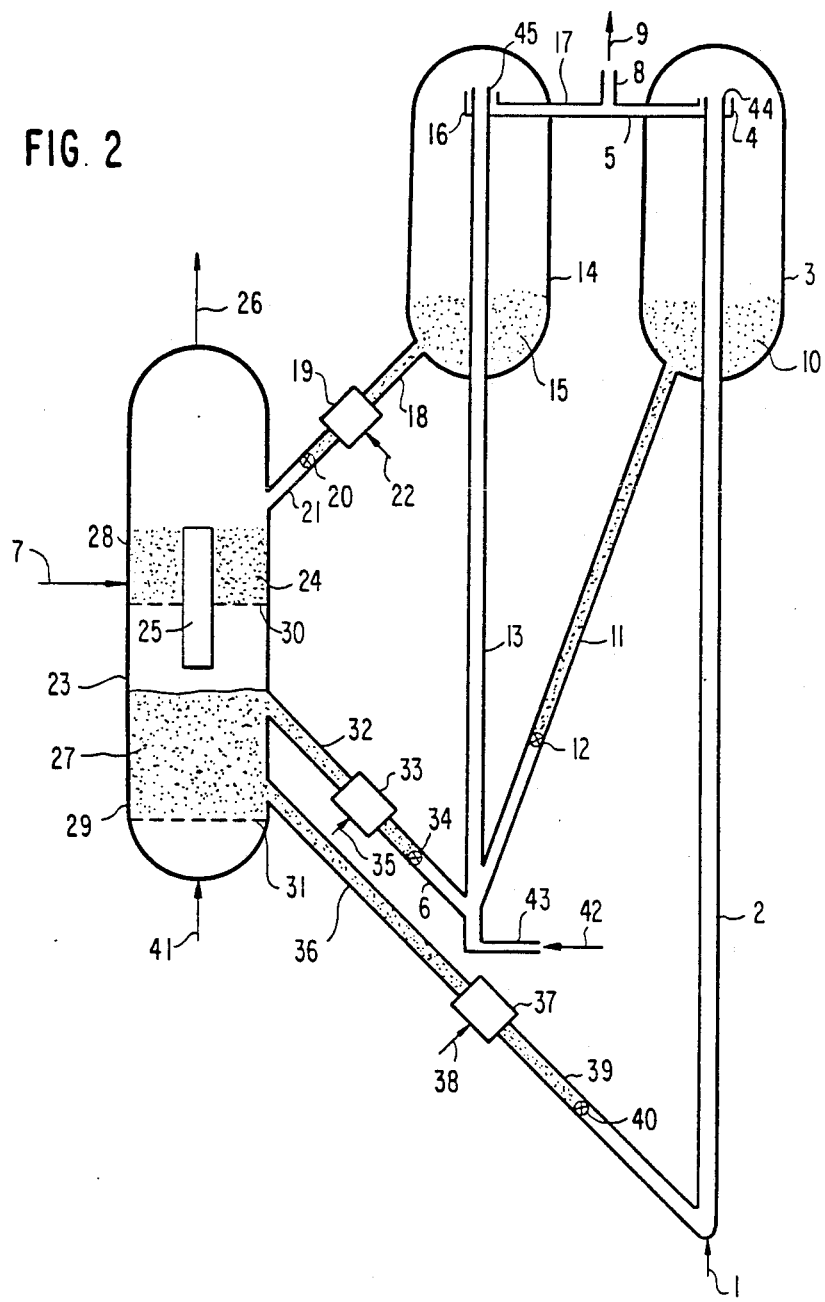
FIG. 2 is a schematic diagram of an apparatus for carrying out the process of the invention.

Referring in detail to FIG. 2 of the drawings, petroleum feedstock is introduced into the lower end of riser reactor 2 through inlet line 1 at which point it is mixed with hot regenerated catalyst coming through line 39 and stripper 37 from regenerator vessel 23. The feedstock is catalytically cracked in passing up riser 2 and the product vapors are ballistically separated from catalyst particles in vessel 3. Riser 2 is of the vented type having an open upper end 44 surrounded by a cup-like member 4 which preferably stops just below the upper end 44 of the riser so that the lip of the cup is slightly upstream of the open riser as shown in FIG. 2. Product vapor line 5 communicates with the interior of the cup so as to discharge product vapors entering the cup from the vapor space of vessel 3. The cup 4 forms an annulus around and concentric to the upper end 44 of the riser tube. The product vapors leave product vapor line 5 and enter combined product vapor line 8.

The spent catalyst 10 leaves the lower part of vessel 3 through spent catalyst removal line 11 and valve 12 to the bottom of riser stripper 13 where it is mixed with regenerated catalyst from line 6 and gas 42 introduced through gas inlet line 43. The mixture of spent catalyst, regenerated catalyst and gas passes up riser stripper 13 where the spent catalyst is heated by the regenerated catalyst, thereby volatilizing high-boiling hydrocarbons, and at least a portion of the high-boiling hydrocarbons are cracked into lighter products by the regenerated catalyst.

The product vapors are ballistically separated from the mixture of catalyst particles in vessel 14. Riser stripper 13 is also of the vented type having an open upper end 45 surrounded by cup-like member 16. The product vapors pass from the annular space defined by cup 16 and the top 45 of riser stripper 13 into product line 17 and is mixed with product vapors from line 5 and the mixture 9 passes out through combined product vapor line 8.

The resulting catalyst mixture 15 in vessel 14 passes into stripper 19 through line 18 where it is stripped with steam from line 22. The stripped catalyst, controlled by valve 20 passes into bed 24 of regenerator 23 through line 21. Oxidizing gas, such as air, is introduced into bed 24 in upper portion 28 of regenerator 23 through line 7. A portion of the coke or catalyst is burned in bed 24 and partially regenerated catalyst flows downwardly through conduit 25 into lower bed 27.

An oxidizing gas, such as air, is introduced into catalyst bed 27 through line 41. This gas flows upwardly through perforated plate 31 into lower bed 27 of catalyst particles. The resulting mixture of combustion products flows upwardly through perforated plate 30 into upper bed 24 and, mixed with combustion gases produced in bed 24, flows out through line 26.

A portion of the regenerated catalyst particles in bed 27 leave through line 32, are contacted in stripper 33 with steam from line 35, and the stripped, regenerated catalyst passes through control valve 34 and line 6 to the bottom of riser stripper 13.

Another portion of regenerated catalyst particles from bed 27 pass through line 36 to stripper 37 where it is contacted with steam from line 38. The stripped, regenerated catalyst passes to the bottom of riser reactor 2 by way of line 39 through valve 40.

EXAMPLE

A carbo-metallic feed at a temperature of about 450° F. is introduced at a rate of about 2000 pounds per hour into the lower end of a vented riser reactor as shown in FIG. 2. The feed is mixed with steam, water, and a zeolite catalyst in a catalyst-to-oil ratio of about 11 to 1 by weight. The catalyst temperature is about 1300° F.

The carbo-metallic feed has a heavy metal content of about 5 parts per million nickel equivalents and a Conradson carbon content of about 7 percent. About 85 percent of the feed boils above 650° F.

The water and steam are injected into the riser at a rate of about 100 and 240 pounds per hour respectively. The temperature within the reactor is about 1000° and the pressure is about 27 psia. The partial pressures of feed and steam are about 11 psia and 16 psia respectively.

Within the riser about 75 percent of the feed is converted to fractions boiling at a temperature less than 430° F. and about 53 percent of the feed is converted to gasoline. During the conversion about 11 percent of the feed is converted to coke. The gasoline products are separated from the catalyst and are withdrawn from the top of the riser reactor.

The catalyst at a temperature of about 980° F., and containing about one percent coke and about 0.5 percent sorbed liquid or gaseous hydrocarbon is passed into the lower portion of a riser stripper as shown in FIG. 2 where it is mixed with regenerated catalyst containing less than about 0.03 percent coke in a weight ratio of regenerated to spent catalyst of 3/1. Flue gas at a temperature of 200° F. and a rate of 800 ft$^3$ per minute is added at the lower portion of the riser stripper to lift the catalyst mixture through the stripper. At the top of the riser stripper the product vapors are separated from catalyst particles, are withdrawn from the top of the riser stripper and are combined with product from the riser reactor. The resulting catalyst mixture may be introduced into a steam stripper where it is contacted with steam at a temperature of about 1000° F. to remove the remaining interstitial trapped gaseous hydrocarbons between the catalyst particles.

The stripped catalyst now containing about 0.9 percent coke and about 0.1 percent of residual sorbed hydrocarbons is introduced into the upper zone of the regenerator as shown in FIG. 2 where it is fluidized and partially regenerated with an air-$CO_2$ mixture introduced from the lower zone of the regenerator. Partially regenerated catalyst is introduced into the lower zone where it is fluidized and regenerated with air. A portion of the regenerated catalyst at a rate of about 33,000 pounds per hour, containing about 0.03 percent coke, is introduced into the riser reactor. A second portion of the regenerated catalyst at a rate of 100,000 pounds per hour, is introduced into the lower portion of the riser stripper where it is mixed with spent catalyst from the reactor and flue gas.

What is claimed is:

1. Apparatus for removing high-boiling liquid hydrocarbon from catalyst particles comprising:
   an elongated tubular conduit having an upstream end and a downstream end;
   means for introducing spent catalyst and means for introducing regenerated catalyst at said upstream end of said conduit;
   means for both stripping said hydrocarbon from said particles and effecting the flow of a gas-solids stream from the upstream end toward the downstream end of said conduit; and
   means for ballistically separating catalyst particles from gases at said downstream end of said conduit.

2. Apparatus for stripping high-boiling hydrocarbons from spent catalyst comprising:
   a substantially vertically oriented, elongated gas-solids contact chamber;
   a spent catalyst inlet conduit, a regenerated catalyst inlet conduit, and a stripping gas inlet conduit, said conduits connected to the lower portion of said elongated contact chamber;

means at the upper portion of said contact chamber for ballistically separating catalyst from vapors;

storage means surrounding said contact chamber for collecting separated catalyst;

means for transferring separated gases and vapors from said contact chamber; and means for transferring catalyst from said storage means.

3. Apparatus for removing carbonaceous material from spent cracking catalyst comprising:

(a) a regenerator for contacting coke-containing catalyst with a combustion-supporting vapor, said regenerator having a spent catalyst inlet and an outlet for regenerated catalyst;

(b) a substantially vertically oriented, elongated gas-solids contact chamber;

(c) a spent catalyst inlet conduit to said contact chamber in communication with a source of spent catalyst;

(d) a regenerated catalyst inlet conduit to said contact chamber in communication with said outlet for regenerated catalyst;

(e) a gas inlet conduit to said contact chamber in communication with a source of flue gas;

(f) means at the upper portion of said contact chamber for ballistically separating catalyst from gases and vapors; and (g) means for storing separated catalyst and transferring said separated catalyst to said regenerator.

* * * * *